United States Patent
Layton, Jr. et al.

(10) Patent No.: US 9,573,236 B2
(45) Date of Patent: Feb. 21, 2017

(54) SKATE BLADE SHARPENING SYSTEM WITH ALIGNMENT ADJUSTMENT USING ALIGNMENT WHEEL

(71) Applicant: Velasa Sports, Inc., Acton, MA (US)

(72) Inventors: Russell K. Layton, Jr., Acton, MA (US); Daniel A. Beaudet, Lexington, MA (US); Ivan D. Goryachev, Nashua, NH (US); Matt Hanczor, Redding, CT (US)

(73) Assignee: VELASA SPORTS, INC., Acton, MA (US)

( * ) Notice: Subject to any disclaimer, the term of this patent is extended or adjusted under 35 U.S.C. 154(b) by 131 days.

(21) Appl. No.: 14/723,564

(22) Filed: May 28, 2015

(65) Prior Publication Data

US 2016/0346893 A1    Dec. 1, 2016

(51) Int. Cl.
*B24B 49/12* (2006.01)
*B24B 3/00* (2006.01)
(Continued)

(52) U.S. Cl.
CPC ............ *B24B 3/003* (2013.01); *A63C 3/10* (2013.01); *B24B 45/003* (2013.01); *B24B 49/12* (2013.01); *G01B 5/255* (2013.01); *G01B 2210/10* (2013.01)

(58) Field of Classification Search
CPC ........... B24B 3/003; B24B 49/12; B24B 9/04; B24B 41/06; B24B 49/00; A63C 3/10
(Continued)

(56) References Cited

U.S. PATENT DOCUMENTS

| 1,219,004 A | 3/1917 | Kalanquin |
| 2,114,967 A | 4/1938 | Myers |

(Continued)

FOREIGN PATENT DOCUMENTS

| CA | 1118514 | 2/1982 |
| CA | 1229985 | 12/1987 |

(Continued)

OTHER PUBLICATIONS

Invitation to Pay Additional Fees issued in International Application No. PCT/US2015/057078, mailed on Feb. 24, 2016.
(Continued)

*Primary Examiner* — Christopher Fulton
(74) *Attorney, Agent, or Firm* — Knobbe, Martens, Olson & Bear LLP

(57) ABSTRACT

A skate blade sharpening system retains a skate blade in a sharpening position whose centerline has a first location relative to a first visual reference feature. A motor-driven rotating shaft has a wheel-mounting location for mounting a grinding wheel for sharpening operation. The shaft accepts an alignment wheel at the wheel-mounting location during an alignment, the alignment wheel having a second visual reference feature having a second location relative to a centerline of the grinding wheel when occupying the wheel-mounting location. An adjustment mechanism moves the shaft transversely during alignment to vary relative position between the wheel-mounting location and the sharpening position including an aligned position in which the centerline of the grinding wheel is aligned with the centerline of the sharpening position, the aligned position being indicated by alignment of the first visual reference feature with the second visual reference feature during alignment.

23 Claims, 28 Drawing Sheets

(51) Int. Cl.
*B24B 45/00* (2006.01)
*G01B 5/255* (2006.01)
*A63C 3/10* (2006.01)

(58) Field of Classification Search
USPC ...... 33/286; 451/9, 10, 11, 15, 54, 365, 367, 451/371, 383
See application file for complete search history.

(56) References Cited

U.S. PATENT DOCUMENTS

| | | | |
|---|---|---|---|
| 2,438,543 A | 3/1948 | Custin et al. | |
| 2,563,018 A | 8/1951 | Fello | |
| 2,599,952 A | 6/1952 | Strayer | |
| 2,722,792 A | 11/1955 | Harrington | |
| 2,775,075 A | 12/1956 | McMaster et al. | |
| 2,819,568 A | 1/1958 | Kasick | |
| 2,990,661 A | 7/1961 | Hackett | |
| 3,118,256 A | 1/1964 | De Witt | |
| 3,259,959 A | 7/1966 | Tobey | |
| 3,574,975 A | 4/1971 | Liss | |
| 3,650,073 A | 3/1972 | Weisman | |
| 3,735,533 A | 5/1973 | Salberg | |
| 3,742,655 A | 7/1973 | Oliver | |
| 3,756,796 A | 9/1973 | Miller | |
| 3,789,551 A | 2/1974 | Norris et al. | |
| 3,800,632 A * | 4/1974 | Juranitch | B24D 15/06 451/370 |
| 3,839,828 A | 10/1974 | Arnold | |
| 3,881,280 A * | 5/1975 | Thompson | B24B 3/003 451/241 |
| 3,988,124 A | 10/1976 | Babcock | |
| 3,988,865 A | 11/1976 | Weisman | |
| 4,055,026 A | 10/1977 | Zwicker | |
| 4,078,337 A * | 3/1978 | Chiasson | B24B 3/003 451/303 |
| 4,094,101 A * | 6/1978 | Robinson | B24B 3/003 269/238 |
| 4,235,050 A | 11/1980 | Hannaford et al. | |
| 4,235,052 A | 11/1980 | Guidry | |
| 4,271,635 A | 6/1981 | Szalay | |
| 4,516,357 A | 5/1985 | Gach | |
| 4,534,134 A | 8/1985 | Consay et al. | |
| 4,549,372 A | 10/1985 | Sexton et al. | |
| 4,558,541 A | 12/1985 | Consay | |
| 4,570,387 A | 2/1986 | Unno et al. | |
| 4,615,144 A | 10/1986 | Peacock et al. | |
| 4,615,149 A | 10/1986 | Yoneda et al. | |
| 4,722,152 A | 2/1988 | Ek et al. | |
| 4,756,125 A | 7/1988 | Kadnar | |
| 4,967,515 A | 11/1990 | Tsujiuchi et al. | |
| 5,009,039 A | 4/1991 | Lager et al. | |
| 5,127,194 A * | 7/1992 | Jobin | B24B 3/003 451/10 |
| 5,129,190 A | 7/1992 | Kovach et al. | |
| 5,177,901 A | 1/1993 | Smith | |
| 5,259,148 A | 11/1993 | Wiand | |
| 5,547,416 A | 8/1996 | Timms | |
| 5,562,526 A | 10/1996 | Yoneda et al. | |
| 5,591,069 A | 1/1997 | Wurthman | |
| 5,601,473 A | 2/1997 | Strain et al. | |
| 5,823,854 A | 10/1998 | Chen | |
| 5,897,428 A * | 4/1999 | Sakcriska | B24B 3/003 451/202 |
| 5,989,114 A | 11/1999 | Donahue et al. | |
| 6,116,989 A | 9/2000 | Balastik | |
| 6,422,934 B1 | 7/2002 | Blach et al. | |
| 6,602,109 B1 | 8/2003 | Malkin et al. | |
| 6,626,745 B1 | 9/2003 | Bernard | |
| 7,118,466 B2 * | 10/2006 | Laney | B24B 41/06 451/276 |
| 7,220,161 B2 | 5/2007 | Eriksson | |
| 7,473,164 B2 | 1/2009 | Sunnen | |
| D603,432 S | 11/2009 | Wilson et al. | |
| 7,934,978 B2 | 5/2011 | Wilson et al. | |
| D665,830 S | 8/2012 | Wilson et al. | |
| 8,246,425 B2 | 8/2012 | Schudel | |
| 8,277,284 B2 | 10/2012 | Wilson et al. | |
| 8,316,742 B2 | 11/2012 | Craig et al. | |
| D681,077 S | 4/2013 | Wilson et al. | |
| 8,430,723 B2 | 4/2013 | Moon | |
| 8,827,768 B2 * | 9/2014 | Allen | A63C 3/10 451/28 |
| 8,888,567 B2 * | 11/2014 | Allen | B24B 9/04 451/383 |
| 9,114,498 B1 | 8/2015 | Layton, Jr. et al. | |
| 9,242,330 B1 | 1/2016 | Layton, Jr. et al. | |
| 9,339,911 B2 * | 5/2016 | Eriksson | B24B 3/003 |
| 9,352,437 B2 | 5/2016 | Layton, Jr. et al. | |
| 9,352,444 B2 | 5/2016 | Layton, Jr. et al. | |
| 9,475,175 B2 * | 10/2016 | Layton, Jr. | B24D 5/10 |
| 2002/0009964 A1 | 1/2002 | Wolf et al. | |
| 2003/0156401 A1 | 8/2003 | Komine et al. | |
| 2004/0209547 A1 | 10/2004 | Hatano et al. | |
| 2005/0130571 A1 | 6/2005 | Sunnen | |
| 2006/0159533 A1 | 7/2006 | Zeiler et al. | |
| 2006/0183411 A1 | 8/2006 | Moon | |
| 2006/0223419 A1 | 10/2006 | Moon | |
| 2007/0054598 A1 | 3/2007 | Uchida et al. | |
| 2008/0176496 A1 | 7/2008 | Tasi | |
| 2008/0280548 A1 | 11/2008 | Wilson et al. | |
| 2010/0125362 A1 | 5/2010 | Canora et al. | |
| 2011/0169233 A1 | 7/2011 | Wilson et al. | |
| 2012/0108151 A1 | 5/2012 | Swist | |
| 2012/0190279 A1 | 7/2012 | Ficai | |
| 2012/0302147 A1 | 11/2012 | Trautner et al. | |
| 2013/0344774 A1 | 12/2013 | Allen | |
| 2014/0179201 A1 | 6/2014 | Proulx | |
| 2015/0367224 A1 * | 12/2015 | Schatz | A63C 3/10 451/371 |
| 2016/0114450 A1 | 4/2016 | Layton, Jr. et al. | |
| 2016/0114451 A1 | 4/2016 | Layton, Jr. et al. | |
| 2016/0114452 A1 | 4/2016 | Layton, Jr. et al. | |
| 2016/0114454 A1 | 4/2016 | Layton, Jr. et al. | |
| 2016/0114461 A1 | 4/2016 | Layton, Jr. et al. | |
| 2016/0114464 A1 | 4/2016 | Layton, Jr. et al. | |

FOREIGN PATENT DOCUMENTS

| | | |
|---|---|---|
| CA | 2260531 | 8/1999 |
| CA | 2309222 | 11/2000 |
| CA | 2323321 | 4/2002 |
| WO | WO 2016/065237 A2 | 4/2016 |

OTHER PUBLICATIONS

International Search Report & Written Opinion of the International Searching Authority issued in International Application No. PCT/US2015/057078, mailed on May 2, 2016.
"CAG One Service AB", downloaded from www.cagone.pl/dokumenty/cag-one-users-manual.pdf, 32 pages, Sep. 2009.
"CAG Profiler Manual", downloaded from www.cagone.com/img/profiler.pdf, 23 pages, Sep. 2010.
"Dupliskate Users Manual", downloaded from www.dupliskate.com/pdf/Dupliskate-User-Manual.pdf, 11 pages, Aug. 2013.
"Prosharp AS2001 Allpro, AS1001 Portable, Skatepal Pro3 Instructions", downloaded from www.prosharp.net/file/broschyroriginalinstructions-eng.pdf, 40 pages, Apr. 2013.
"Skatepal Pro Instructions", downloaded from www.prosharp.net/file/instruction-skatepal-pro2-eng.pdf, 12 pages, Oct. 2010.
"Spareparts Skatepal Pro 3", downloaded from www.prosharp.net/file/schematicssp13a1.pdf, 6 pages, Mar. 2013.
"SSM Catalog", downloaded from www.skyice.org/ssm_catalogue_2011.pdf, 12 pages.
CAG One Skate Sharpeners, "CAG One New Evolution Sharpening Machine", URL: http://cagone.com/evolution/, pp. 1-4, (Date Unknown).
Craig Forsythe, "CAG Speed III Sharpener Manual", Teflone Publications MMV, downloaded from www.cagone.com/img/speed.pdf, 14 pages, Aug. 2009.

(56) References Cited

OTHER PUBLICATIONS

Prosharp, "Grinding Wheels—SkatePals", 2015 ProSharp AB, URL: http://prosharp.com/products/grinding-wheels/grinding-wheels, pp. 1-9.

* cited by examiner

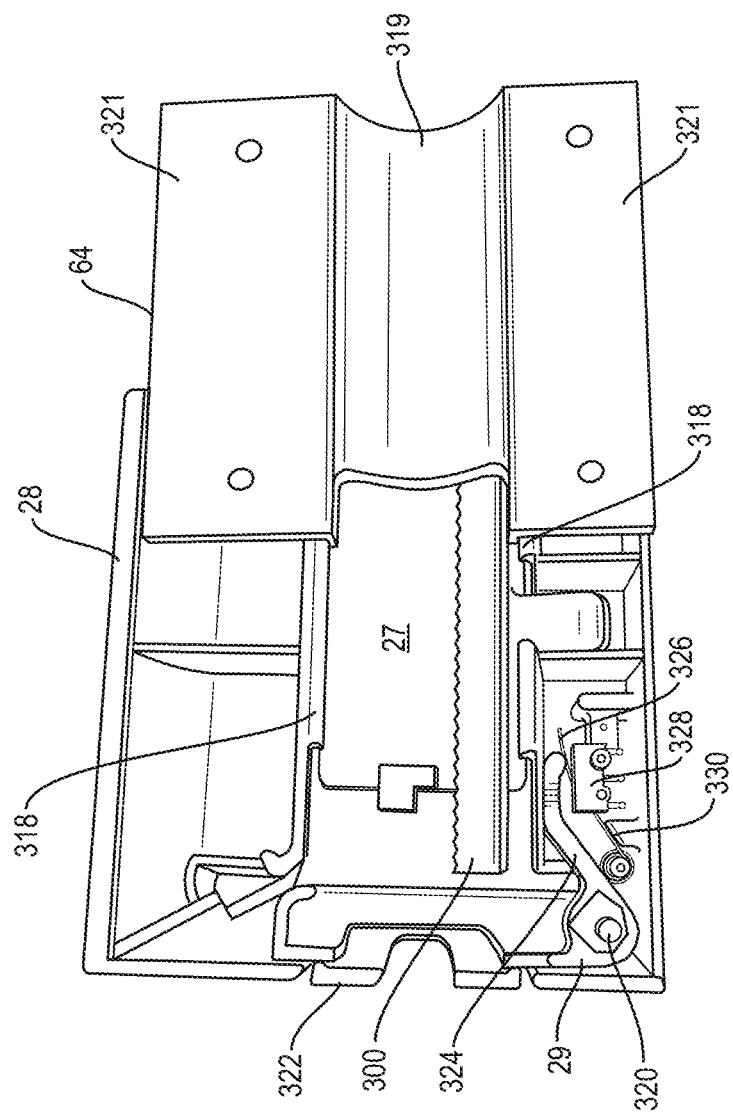

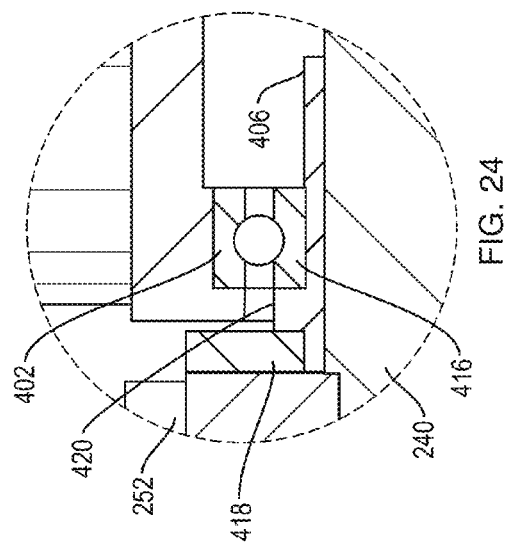
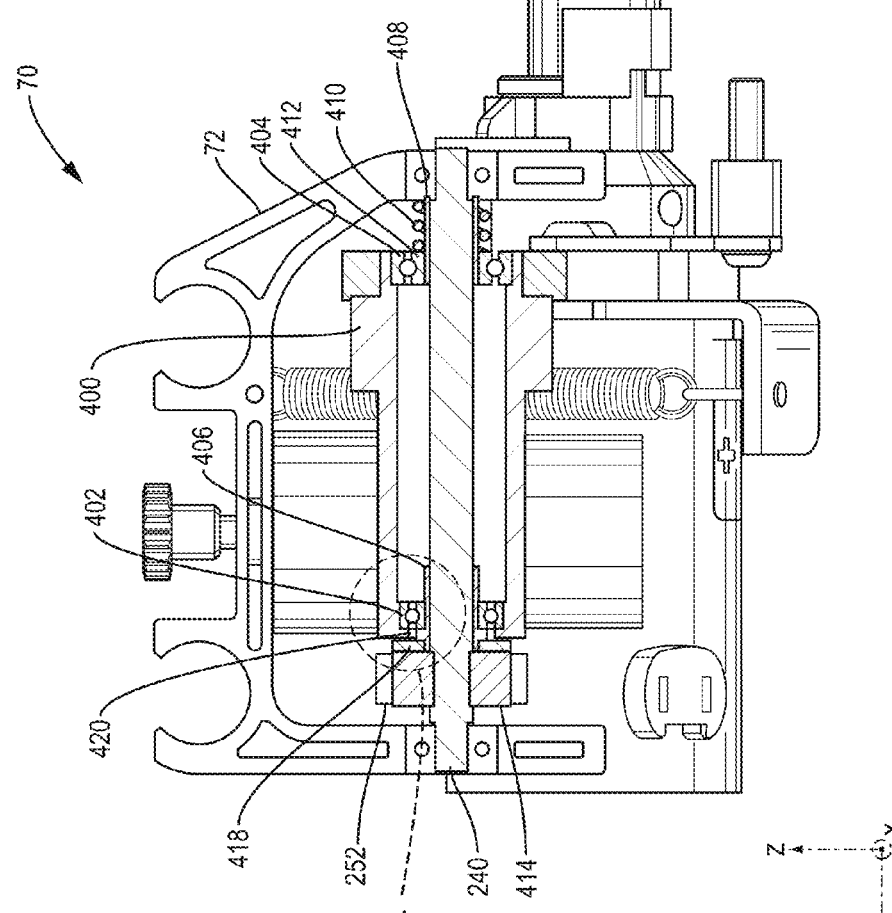
FIG. 24
FIG. 23

SKATE BLADE SHARPENING SYSTEM WITH ALIGNMENT ADJUSTMENT USING ALIGNMENT WHEEL

SUMMARY

A skate blade sharpening system is a specialized type of grinder specifically configured to sharpen ice skates. One key aspect in sharpening ice skates, such as hockey skates, is the accuracy with which a grinding wheel is aligned with a skate blade. Specifically, a mid-plane of the grinding wheel is ideally aligned with the mid-plane of the skate blade. The accuracy of the alignment directly influences the degree to which the outside edges of a sharpened skate blade lie in the same horizontal plane, which in turn affects the predictability and consistent feel of the skate blade to a skater. If the edges are of unequal height, the low edge will feel duller and less certain to the skater, while the high edge will feel sharper. For the side-to-side grip in the ice to feel equal for the skater, the height of the inside and outside edges should be as equal as possible. This need for equal edge height translates to a need for accurate alignment between the grinding wheel and the skate blade when the blade is being sharpened.

The present disclosure is concerned primarily with aspects of alignment, including the manner of gauging alignment.

Known skate sharpening systems have used trial-and-error alignment techniques. A skate blade is sharpened, then a gauge is used to determine how even the resulting edges are. Some known gauges are placed on the skate blade and have pivoting members that rest on the two blade edges. Unevenness is measured as non-perpendicularity of the pivoting member with respect to the longitudinal plane of the skate blade. Measured unevenness is translated to a corresponding value of wheel-blade misalignment. A position adjustment is then made by this amount, and the blade is sharpened again. Typically the blade unevenness is then checked again, and if necessary the process of adjusting, sharpening, and checking is again repeated. This cyclical process is time consuming and not intuitive for an unskilled user. An unskilled user may not know how much material to remove given an amount of adjustment made, and also may not know how much adjustment to make given a certain amount of edge unevenness. Additionally, this cyclical process may unnecessarily accelerate the consumption of the skate blade, and create issues of inconsistency between the left and right skates in a pair.

A variety of mechanisms for adjusting the relative positions of the grinding wheel and skate blade are known. There are three general limitations with known mechanisms. One is problematic mechanical coupling between the position adjustment mechanism and a pivoting mechanism that permits a grinding wheel mounted on a pivoting arm to follow the edge of a skate blade in operation. In some known systems, the problematic coupling interferes with smooth pivoting and thus creates inconsistent grinding forces, with corresponding degraded sharpening results. Known systems also employ locking mechanisms that are used to secure the alignment of the grinding wheel and the skate blade. These locking mechanisms are known to shift the position of a member (e.g., grinding wheel) after it has been adjusted, introducing error in the alignment. Another general issue with known adjustment mechanisms is the placement of user controls used for adjustment. It is known that these mechanisms are often difficult to reach and adjust for the user.

Disclosed herein are apparatus and methods for addressing the above and other shortcomings of known skate sharpening systems, specifically shortcomings pertaining to alignment between a grinding wheel and a skate blade to be sharpened. In particular, a disclosed approach provides for accurately gauging alignment without requiring that a sharpening be performed first. A disclosed position adjustment mechanism provides for smoother adjustment movement and for decoupling of adjustment from the pivoting motion occurring during sharpening, improving positioning accuracy.

In particular, a skate blade sharpening system is disclosed that includes a clamp configured to retain a skate blade in a sharpening position, a centerline of the sharpening position having a first predetermined location relative to a first visual reference feature of the skate sharpening system. The sharpening system further includes a motor-driven rotating shaft, the shaft having a wheel-mounting location at which a grinding wheel is mounted to rotate with the shaft and contact the skate blade in the sharpening position during a sharpening operation. The shaft also accepts an alignment wheel mounted at the wheel-mounting location during an alignment operation, the alignment wheel having a second visual reference feature that, when the alignment wheel occupies the wheel-mounting location, has a second predetermined location relative to a centerline of the grinding wheel when occupying the wheel-mounting location.

The sharpening system further includes an adjustment mechanism for moving the shaft transversely during the alignment operation to vary a relative position between the wheel-mounting location and the sharpening position across a range, the range including an aligned position of the wheel-mounting location in which the centerline of the grinding wheel when occupying the wheel-mounting location is aligned with the centerline of the sharpening position, the aligned position being indicated by alignment of the first visual reference feature with the second visual reference feature during the alignment operation.

Through the use of visual reference features that can be brought into mutual alignment using the adjustment mechanism, the grinding wheel can be aligned with the sharpening position of the skate blade as an initial step prior to performing any sharpening. This avoids the trial-and-error approach of known skate sharpening systems. Additionally, by using an alignment wheel separate from the grinding wheel, the grinding wheel need not incorporate alignment features and thus may be manufactured relatively simply and inexpensively.

In one embodiment, the first visual reference feature is part of an alignment tool having a blade portion that is placed in the sharpening position, temporarily bringing the first visual reference feature into proximity with the second visual reference feature for the alignment process. Then the alignment tool is removed, and the skate blade is placed in the sharpening position for sharpening. Because the blade portion of the alignment tool occupies the same sharpening position as the skate blade, the skate blade has a known location relative to the position of the first visual reference feature of the alignment tool during alignment.

The second visual reference feature may include an alignment notch or protrusion on the alignment wheel, and the first visual reference feature may include an indicator feature placed along a path of the alignment wheel for the alignment operation, such as an alignment tool.

In another respect, a method is disclosed of aligning a grinding wheel to a sharpening position in a skate blade sharpening system, wherein the sharpening position is occupied by a skate blade during sharpening, the sharpening system including a first visual reference feature having a first predetermined location relative to a centerline of the sharpening position. The method includes mounting an alignment wheel at a wheel-mounting location on a motor-driven shaft of the sharpening system, the shaft being movable transversely by an adjustment mechanism to vary a relative position between the shaft and the sharpening position. The alignment wheel has a second visual reference feature having a second predetermined location relative to a centerline of the grinding wheel when subsequently occupying the wheel-mounting location in a sharpening operation. The method further includes operating the adjustment mechanism to bring the second visual reference feature into alignment with the first visual reference feature, thereby bringing the wheel-mounting location of the shaft to an aligned position in which the centerline of the grinding wheel when occupying the wheel-mounting location is aligned with the centerline of the skate blade position.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 22 is a bottom view of a slot cover;

FIG. 23 is a section view of one end of a carriage assembly;

FIG. 24 is a close-up view of a portion of FIG. 23;

DETAILED DESCRIPTION

Figure 1:
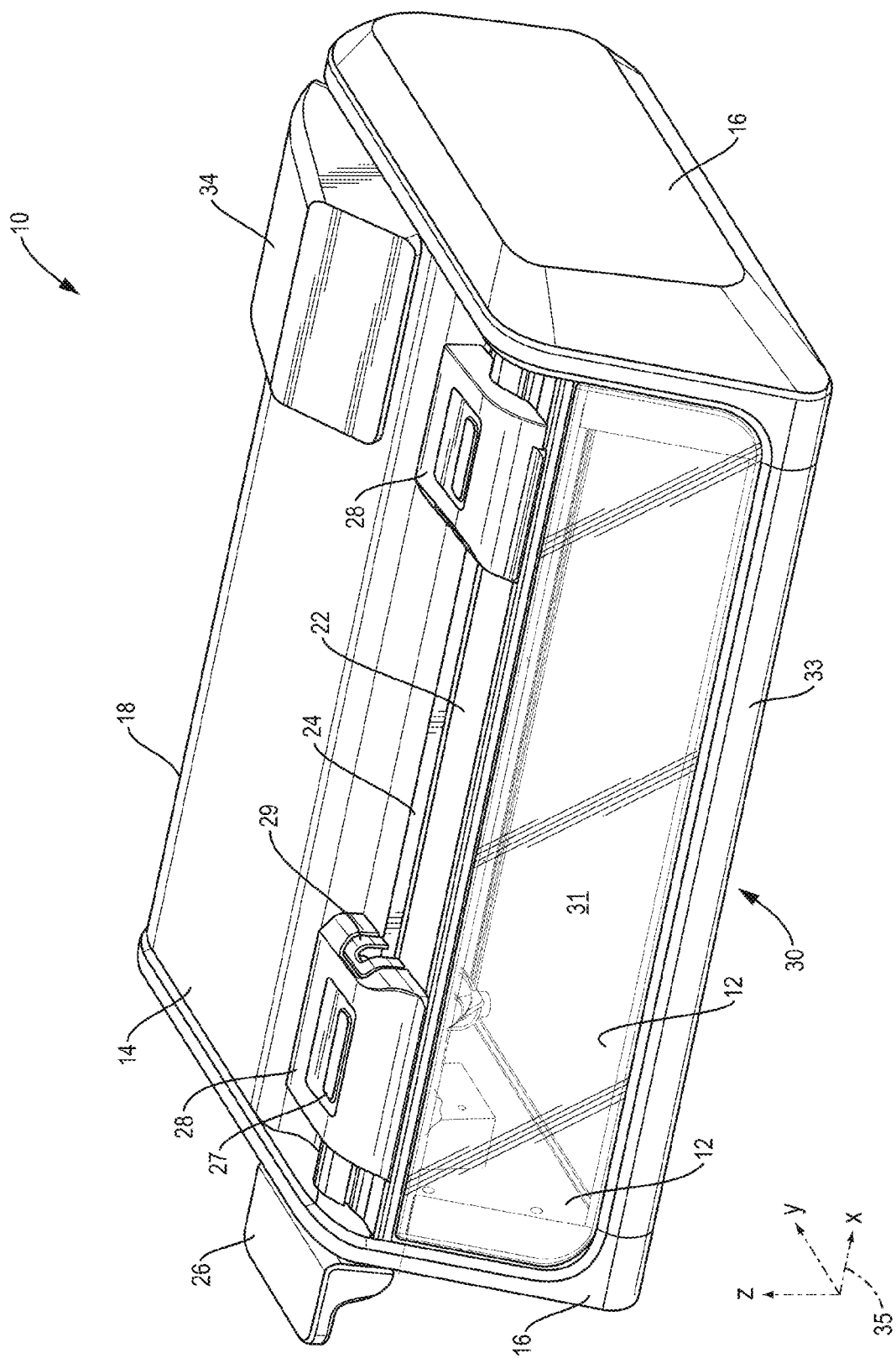
FIG. 1 is a perspective view of a skate sharpening system.

FIG. 1 is a perspective view of a skate sharpener 10 used to sharpen the blades of ice skates. It has a box-like housing with structural elements including a rigid frame 12 (bottom visible in FIG. 1) and a rigid chassis 14. Attached components include end caps 16 and a rear cover 18. The chassis 14 includes a front platform portion 22, also referred to as "platform" 22 herein. The platform 22 includes an elongated slot 24 for receiving the blade of an ice skate for sharpening, and the blade is retained by clamp jaws (not shown) on the underside of the platform 22 which are actuated by a mechanism including a clamp paddle 26. Disposed on the platform 22 are slot covers or "scoops" 28 at respective ends of the slot 24, each including a respective bumper 29 serving to sense contact with a skate blade holder. An outward-opening door 30 having a glass panel 31 and lower hinge portion 33 extends across a front opening. A user interface display panel 34 is disposed at top right on the chassis 14. The skate sharpener 10 also includes a control module or controller, which is not visible in FIG. 1 and may be located, for example, inside of the rear cover 18. Further mechanical and electrical details are provided below.

FIG. 1 also shows a coordinate system 35 for references to spatial directions herein. The X direction is left-to-right, the Y direction front-to-back, and the Z direction bottom-to-top with respect to the skate sharpener 10 in the upright, front-facing orientation of FIG. 1. This coordinate system also defines an X-Y plane (horizontal), X-Z plane (vertical and left-to-right), and Y-Z plane (vertical and front-to-back). Using this coordinate system 35, the slot 24 extends in the X direction and the skate blade is clamped in an X-Z plane during sharpening as described more below.

Figure 2:
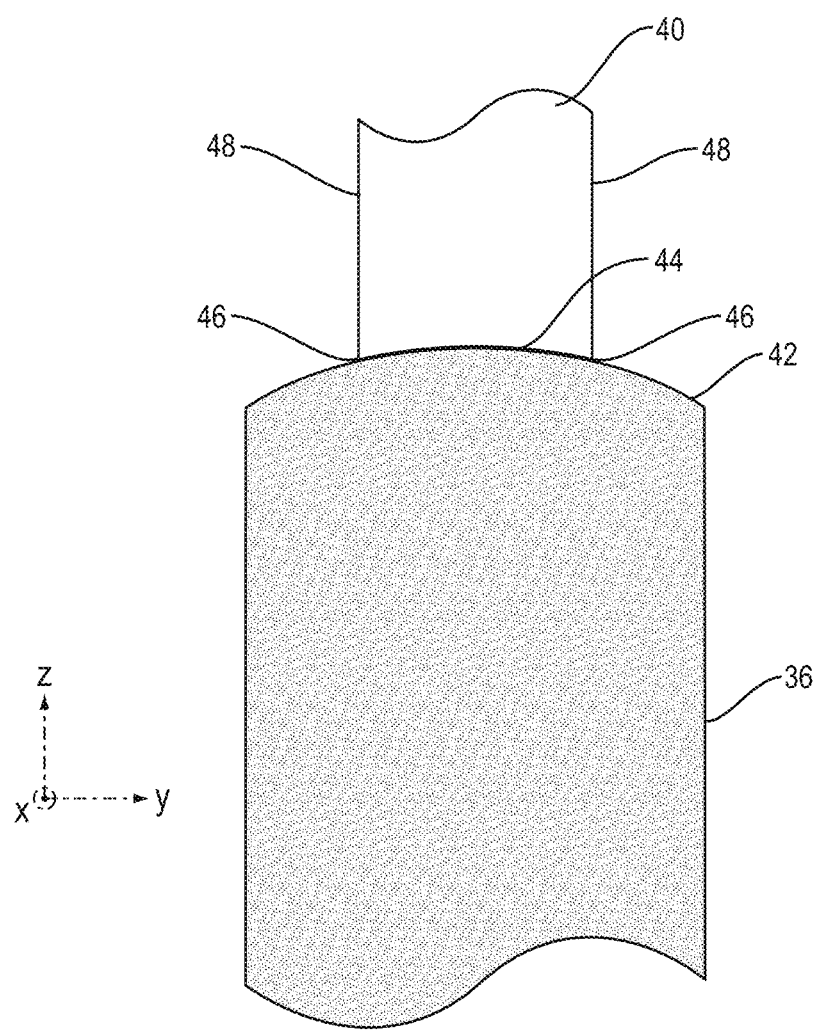
FIG. 2 is a schematic depiction of a grinding wheel contacting a skate blade during sharpening.

FIG. 2 depicts how a skate blade is sharpened. This is a schematic edge-on view of a lower portion of a skate blade 40 in contact with an outer edge of a grinding wheel 36. With reference to the coordinate system 35, this is a view in the X direction. As shown, the grinding wheel 36 has a convex rounded grinding edge 42. In practice the grinding edge 42 may be generally hemispherical. The grinding wheel 36 rotates in the plane of the blade 40 (X-Z plane, into the paper in FIG. 2), thereby imparting a corresponding concave rounded shape to a lower face 44 of the skate blade 40. Two acute edges 46 are formed at the intersection of the curved lower face 44 and the respective sides 48 of the blade 40. As material is removed, a clean and precise arcuate shape is restored to the lower face 44, including sharper edges 46. In practice, the radius of curvature of the lower face 44 is in the general range of 3/8" to 1", with one generally preferred radius being 1/2".

It will be appreciated that the disclosed methods and apparatus may be used with other blade profiles, including flat and V-shaped, for example.

Returning to FIG. 1, basic operation with a complete skate is as follows. First a user may need to install a grinding wheel onto an internal carriage (not shown) accessible via the front opening. For this the user opens the door 30, rotating it forward and downward about the horizontal hinge 33, and then closes the door after successfully installing the grinding wheel. The nature of the installation will be apparent from the more detailed description below. The user then clamps the blade of the skate in the slot 24 and slides the scoops 28 inwardly until the bumpers 29 are engaged by the blade holder part of the skate. Each bumper 29 actuates a limit switch within the respective scoop 28, so that the engagement is sensed by the controller to enable sharpening to proceed. The user then interacts with a user interface presented on the display panel 34 to initiate a sharpening operation. Subject to certain conditions as described more below, control circuitry of the control unit automatically operates both a grinding motor to spin a grinding wheel and a separate carriage motor (both described below) to move the rotating grinding wheel back and forth along the lower face of the skate blade a desired number of times. Each traversal of the grinding wheel across the length of the blade is referred to as a "pass". In each cycle of two passes (one to the left and the other to the right), the grinding wheel is moved to a far-right position at one end of the skate blade to permit a communications exchange between circuitry on the wheel and the control unit. This communication and related control are described below. Upon completion of a desired number of passes, the control unit stops both the rotation and back-and-forth motion of the wheel 36, and the user unclamps and removes the skate blade from the sharpener 10.

It is noted that controls and locations could be reversed in alternative embodiments, so that the communications position would be a far-left position rather than a far-right position.

The above operation may also be used with bare removable skate blades of the type known in the art. In this case a blade holder or other mechanical aid of some type may be used to enable a user to position the bare blade in the slot 24 for clamping and to engage the bumpers 29 of the scoops 28 to permit operation. Alternatively, a bare blade could also be positioned without a blade holder. As described more below, a blade holder may engage limit switches on the slot covers 28 to enable sharpening operation, and enables a user to insert a loose skate blade in clamping jaws.

Figure 3:
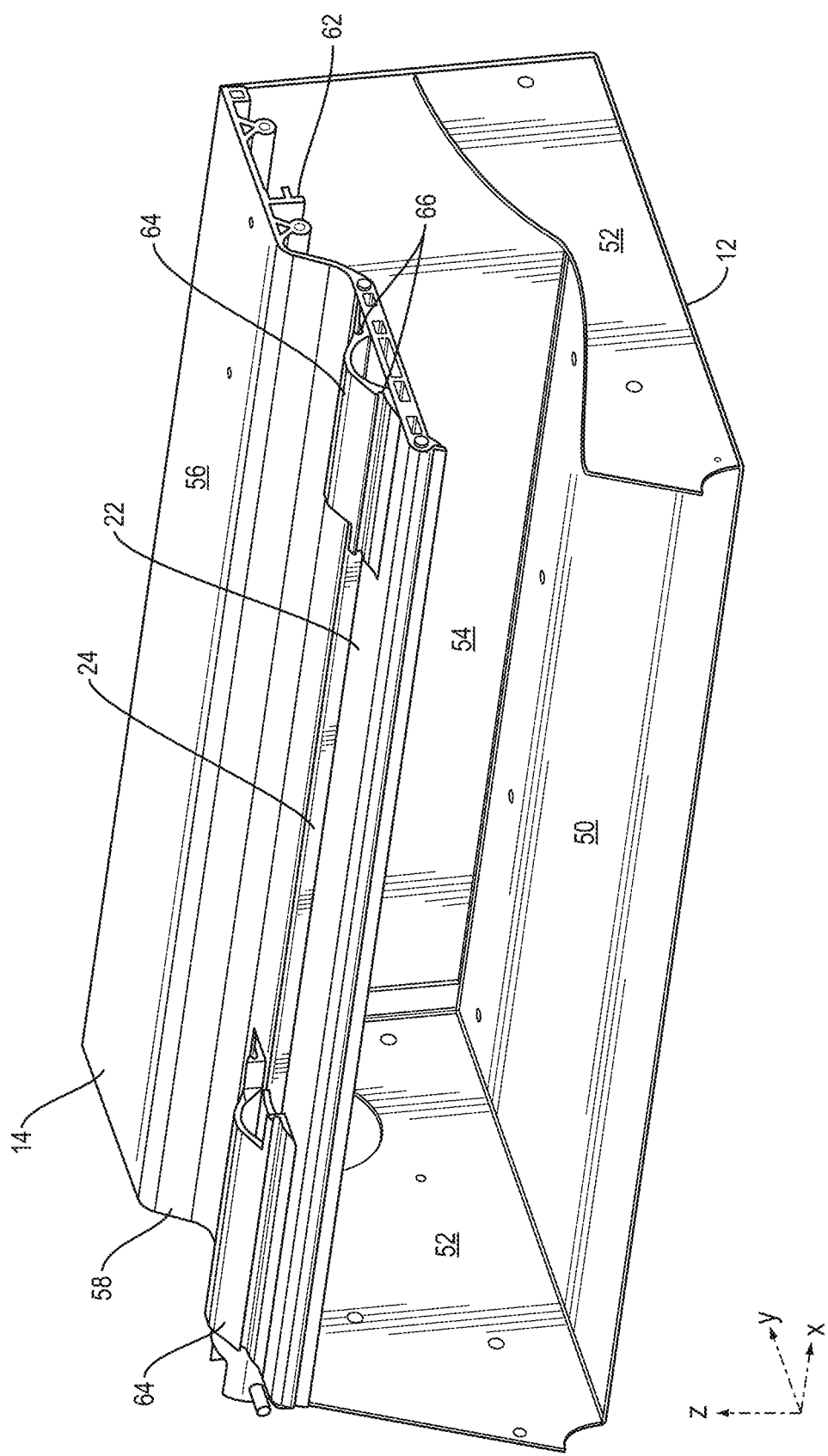
FIG. 3 is a perspective view of a metal frame and chassis of a sharpening system.

FIG. 3 is a view of the frame 12 and chassis 14. In one embodiment, the frame 12 is made of a single piece of sheet metal, folded to form a bottom 50, sides 52 and back 54. The chassis 14 serves as a top for the sharpener 10 and provides support for key components including a skate clamp and a carriage assembly, both described below. The chassis 14 is a rigid component made of metal or other suitably strong material. In one embodiment, the chassis 14 is made of aluminum and formed by extrusion, which can provide very accurate dimensions and geometry in a highly repeatable manner. The chassis 14 may be made of other materials and by other methods, including machining for example, in alternative embodiments.

As shown, the chassis 14 has an S-like cross section defining the frontward platform 22 and a rearward shelf portion ("shelf") 56 separated by a sloping wall 58. The underside of the shelf 56 includes two rails 60 on which a carriage (not shown) moves, as well as a downward-projecting flange 62. As described more below, a toothed "gear rack" that forms part of a rack-and-pinion mechanism for moving the carriage is attached to the flange 62. On the platform 22 at each end of the slot 24 are rounded projections 64 on which the scoops 28 are slidably mounted. The projections 64, also referred to as "arches" 64 below, have retention grooves 66 that engage with corresponding features in the scoops 28 to retain the scoops 28 on the projections 64 while permitting them to slide left and right.

Figure 4:
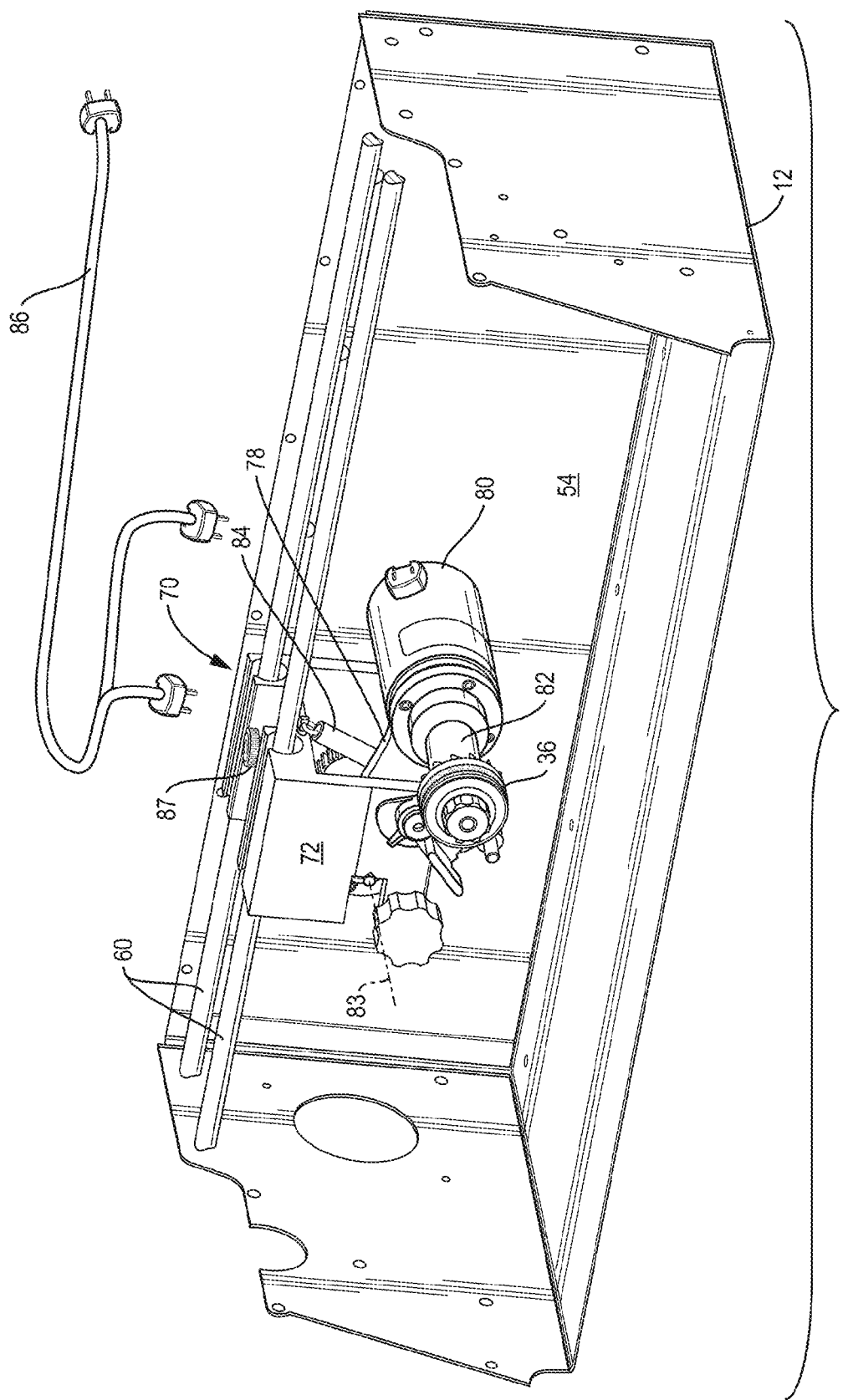
FIG. 4 is a perspective view of an interior of a sharpening system including a carriage assembly.

FIG. 4 shows the sharpener 10 with several external components removed. The 4-sided sheet metal frame 12 is fully visible. A carriage assembly 70 includes a carriage 72 mounted on the two rails 60, which are shown as separated from the rest of the chassis 14 in this view. The carriage assembly 70 includes a pivoting motor arm 78 to which a grinding wheel motor 80 is mounted. The grinding wheel 36 is mechanically coupled to the rotating shaft of the motor 80 by an elongated spindle 82. The motor arm 78 has limited rotational travel about a horizontal pivot axis 83, so that the grinding wheel 36 can move in a vertical direction to follow the profile of a skate blade when the sharpener 10 is in operation. In the illustrated embodiment, the motor arm 78 is biased toward an upper vertical limit by a spring 84 connected between the motor arm 78 and an upper portion of the carriage 72.

One important feature of the presently disclosed skate sharpener 10 is use of a compact (small-diameter) grinding wheel 36. Specifically, its diameter is less than the diameter of the grinding wheel motor 80 by which it is rotated. Use of a compact grinding wheel 36 can provide certain advantages including greater precision in operation and lower cost.

Also shown in schematic fashion in FIG. 4 is a wire harness 86 providing electrical connections between the grinding wheel motor 80 and the above-mentioned controller as well as between the controller and a carriage motor mounted within the carriage 72 (not visible in FIG. 4). In FIG. 4 the wire harness 86 is shown separate from the rest of the unit for ease of illustration, but it is actually located inside the unit along the rear wall 54. It preferably is self-supporting along its length in a manner that maintains its vertical position while permitting back-and-forth movement of the connectors attached to the carriage assembly 70. An example of a suitable support element is a ribbon-like material of the type used in printers and other machines with translating components. This material can flex about a transverse axis while being stiff about a longitudinal axis, and thus can maintain horizontal straightness while also flexing in a desired curling manner about a vertical axis that follows movement of the carriage assembly 70.

In operation, the grinding wheel 36 is rotated by the grinding wheel motor 80 via the spindle 82, and the carriage assembly 70 is moved back and forth along the rails 60 by action of a rack-and-pinion mechanism that includes a motor-drive pinion gear 87 engaging a toothed rack on the underside of the chassis 14 (described more below). The pinion gear 87 is driven by a carriage motor mounted within the carriage 72, not visible in FIG. 4. Each unidirectional pass of the grinding wheel 36 begins with the grinding wheel 36 located off one end of the skate blade and at the upper vertical limit position by action of the spring 84. As the carriage assembly 70 is moved toward the opposite end of the sharpener 10, the grinding wheel 36 encounters an end of the skate blade and is deflected downward to follow the profile of the skate blade across its length. At the end of the pass, the wheel 36 rides off the other end of the skate blade and returns to the vertical limit position by action of the spring 84.

Figure 5:
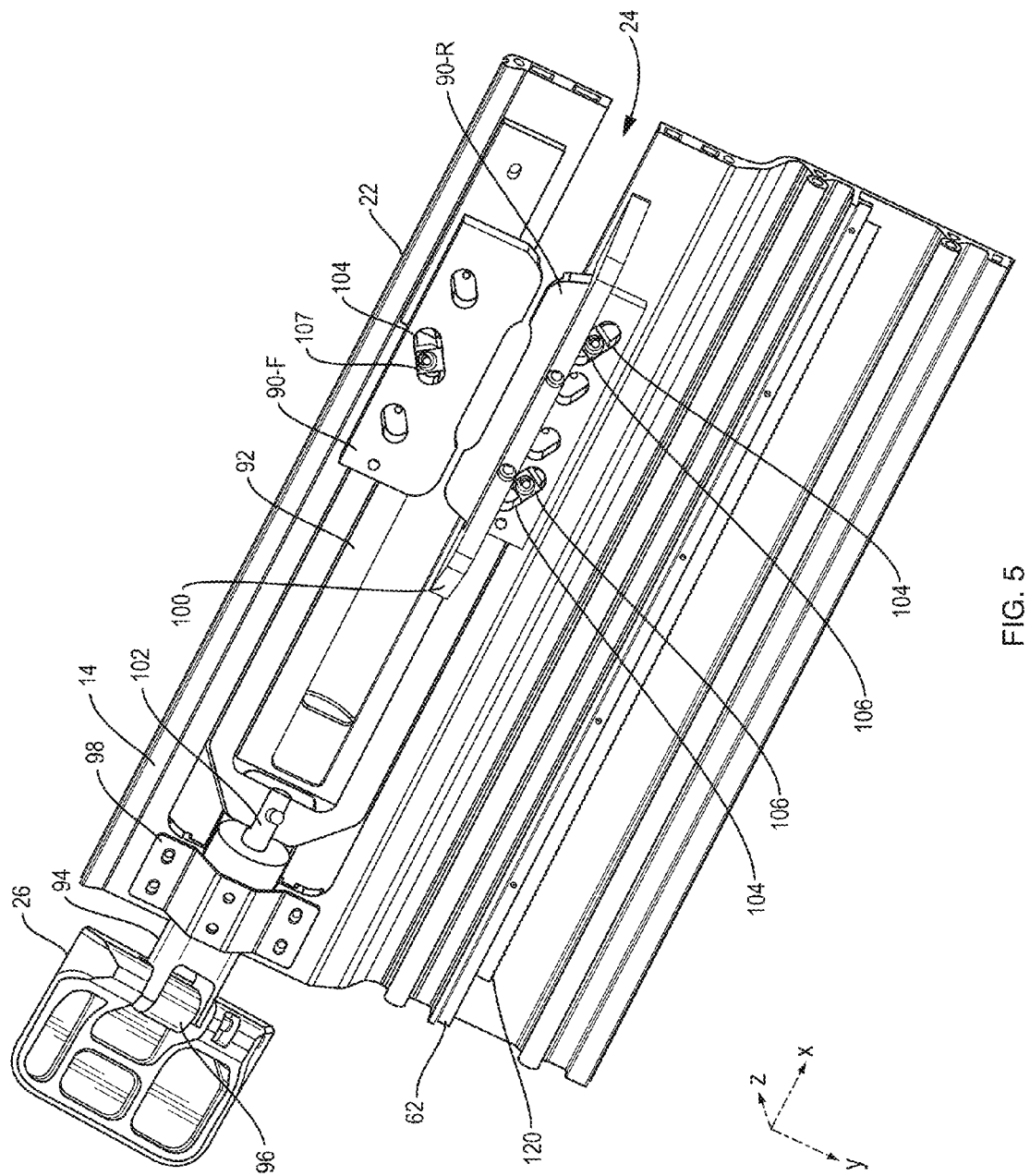
FIG. 5 is a perspective view of a skate blade clamp.

FIG. 5 shows the underside of the chassis 14. It includes a skate blade clamping mechanism whose major components are a pair of clamp jaws 90, specifically a front jaw 90-F and a rear jaw 90-R; a pull rod fork 92; a clamp cylinder 94; and a cam 96 at the underside of the clamp paddle 26 that rotates therewith. The clamp cylinder 94 is retained by a bracket 98. Also shown is a jaw guard 100. The clamp cylinder 94 has a pull rod 102 connected to the pull rod fork 92 and an internal spring-piston arrangement that actuates the pull rod 102 and thus the jaws 90 via the pull rod fork 92.

As shown, the jaws 90 each include angled slots 104, and in the slots 104 are arranged rectangular guide blocks 106 that retain the jaws 90 at the underside of the platform 22 with spacing to permit the jaws 90 to slide in the long direction of the slots 104. The front jaw 90-F is retained by one guide block 107 in a center slot 104, while the rear jaw 90-R is retained by respective guide blocks 106 in outer two slots 104. This arrangement permits the front jaw 90-F to rotate very slightly about a Z-direction axis extending through the single guide block 106, while the rear jaw 90-F is rotationally fixed. Additional details are provided below.

When the clamp paddle 26 is in the position shown in both FIG. 5 and FIG. 1, i.e., extending horizontally away from the platform 22, the cam 96 does not engage the internal piston of the clamp cylinder 94, and the action of the internal spring is to retract the pull rod 102 (toward the left in FIG. 5) so that the jaws 90 are brought toward each other by action of the angled slots 104 and guide blocks 106, 107. This is a referred to as a "closed" position, in which the jaws 90 are either just touching each other or are only slightly spaced apart, less than the width of the thinnest skate blade to be sharpened. Because this position is created by the spring alone, it is referred to as a "biased closed" position.

When a skate blade is to be clamped for sharpening, a user rotates the clamp paddle 26 to open the jaws 90. Referring to FIG. 1, the user pushes downward on the outer part of the clamp paddle 26. In FIG. 5, the clamp handle 26 rotates out of the page, rotating the cam 96 accordingly and causing it to push against the piston within the clamp cylinder 94. This force works against the spring bias to extend the pull rod 102 and push on the jaws 90, causing them to move away from each other by action of the angled slots 104 and guide blocks 106, 107. The space between the jaws in the open position is wider than the widest skate blade to be sharpened. The cam 96 and head of the piston may be co-configured to establish a detent with the jaws in the fully open position. The skate blade is then inserted through the slot 24 between the jaws 90, and the user then rotates the clamp paddle 26 upwardly (FIG. 1) to close the jaws 90 on the skate blade. It will be appreciated that the front jaw 90-F automatically rotates as necessary to close snugly against the skate blade with balanced force across the length of the jaws 90. In the absence of this rotating feature, any imperfection in alignment of the jaws 90 could create undesirable binding and/or rotational skewing of the skate blade, adversely affecting sharpening operation.

The jaw guard 100 protects against the possibility of contact between the grinding wheel 36 and the jaws 90. If the sharpener 10 were to somehow be operated without a skate blade present, then without the jaw guard 100 the wheel 36 would move across the jaws 90 at its upper vertical limit position, potentially damaging the grinding wheel 36 and/or the jaws 90. This is prevented by the jaw guard 100, which would be encountered by the spindle 82 (FIG. 4) and keep the grinding wheel 36 in a more downward position safely away from the jaws 90.

Also shown in FIG. 5 is the above-mentioned rack 120 that is part of the rack-and-pinion mechanism for moving the carriage 70, as mentioned above. In the illustrated embodiment it is an elongated member, of a material such as metal or plastic, attached to the flange 62. In an alternative embodiment, the rack 120 could be formed by machining or otherwise forming a toothed pattern in the flange 62 or similar feature of the chassis 14. In yet other alternative embodiments, a different type of mechanism such as a belt drive might be used to move the carriage 70.

Figure 6:
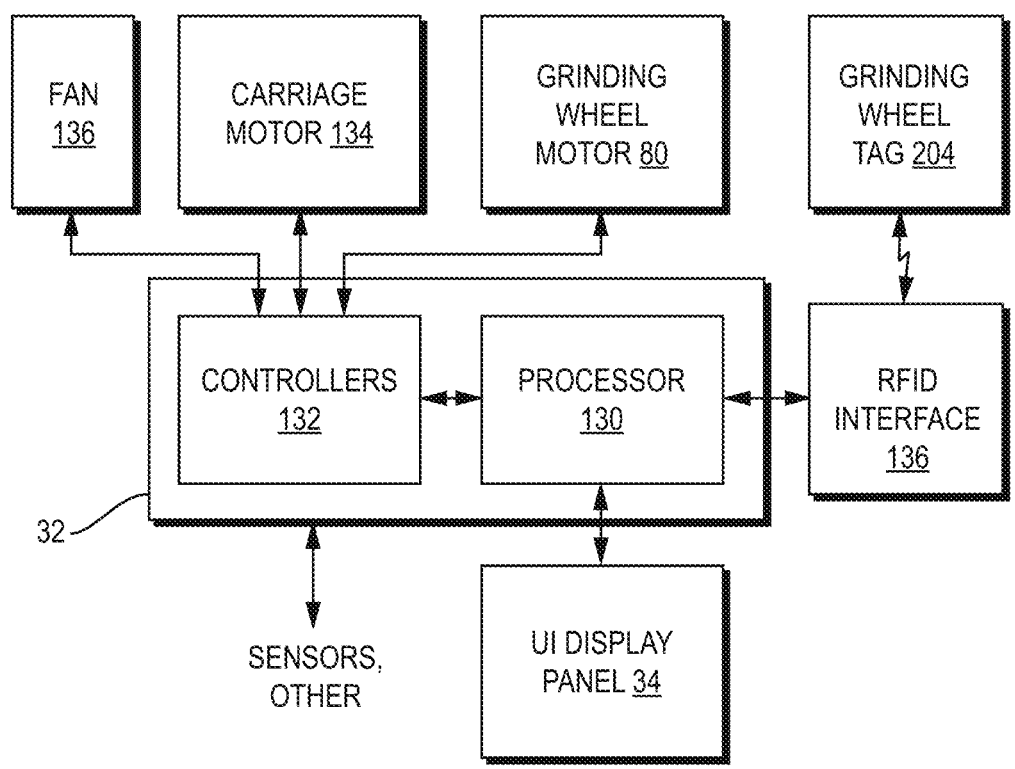
FIG. 6 is a block diagram of an electrical subsystem of a skate sharpening system.

FIG. 6 is an electrical block diagram of the skate sharpener 10. A control unit 32 includes a processor 130 and one or more controllers 132. The controllers 132 provide lower-level control of corresponding elements, such as the grinding wheel motor 80, a carriage motor 134, and a fan 136. Also shown are the user interface (UI) display panel 34 and RFID interface circuitry 137 in radio communications with an identification tag 204 of the grinding wheel 36 (described more below). Both the controllers 132 and processor 130 are computerized devices including memory, I/O interface circuitry and instruction processing circuitry for executing computer program instructions stored in the memory. The controllers 132 may be specialized for low-level real-time control tasks such as achieving and maintaining a commanded rotational speed for a motor. The processor 130 may have a more generalized architecture and potentially richer set of programming resources to perform a variety of higher-level tasks, including interfacing to a user via the UI display panel 34. The processor 130 executing instructions of a particular computer program may be viewed as circuitry for performing functions defined by the program. For example, the processor executing instructions of a sharpening operation controller may be referred to as sharpening control circuitry, and the processor executing instructions related to usage control may be referred to as usage control circuitry. As mentioned above with reference to FIG. 1, the controller 32 may be located within the rear cover 18.

Figure 7:
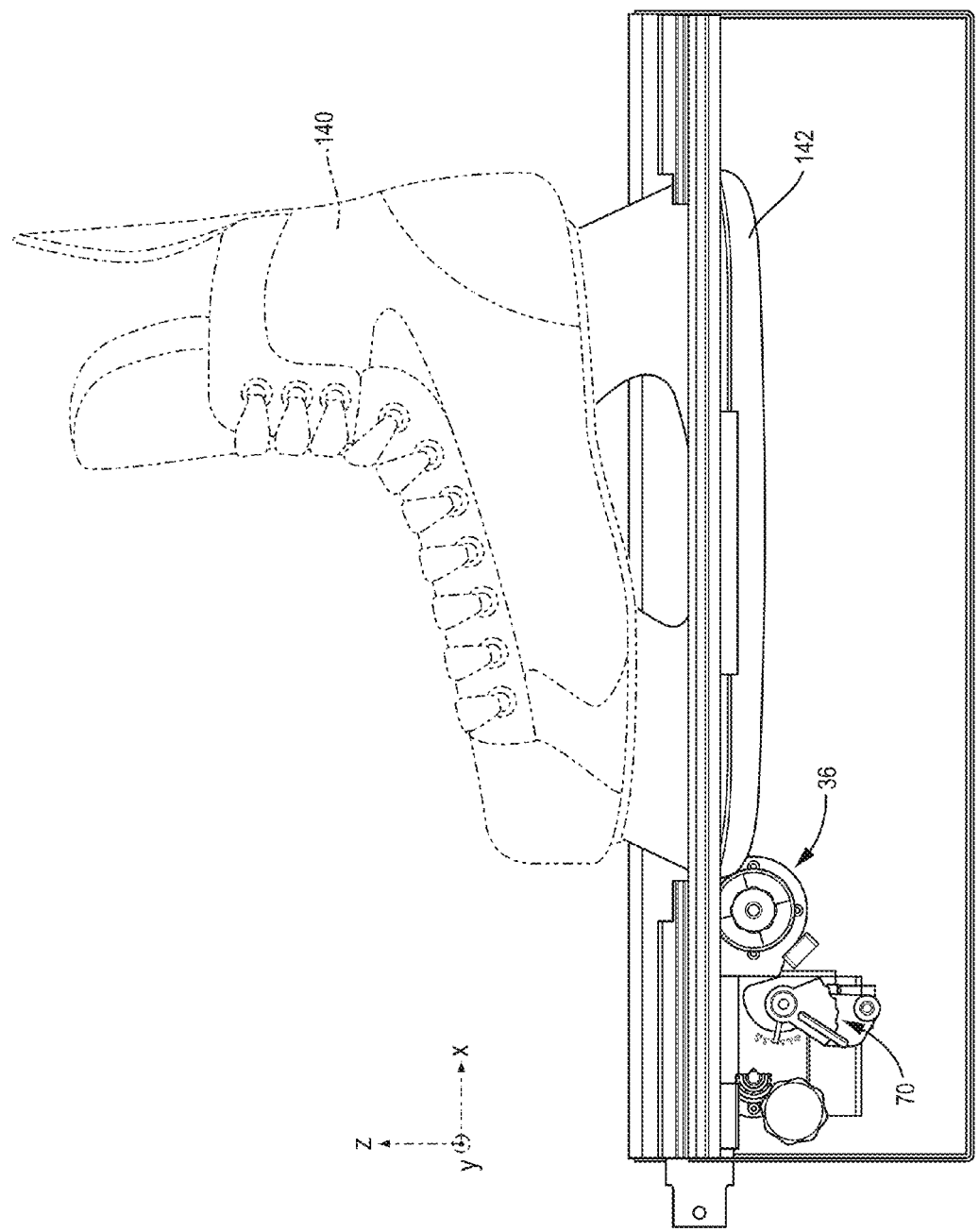
FIGS. 7 and 8 are front elevation views of a sharpening system.
Figure 8:
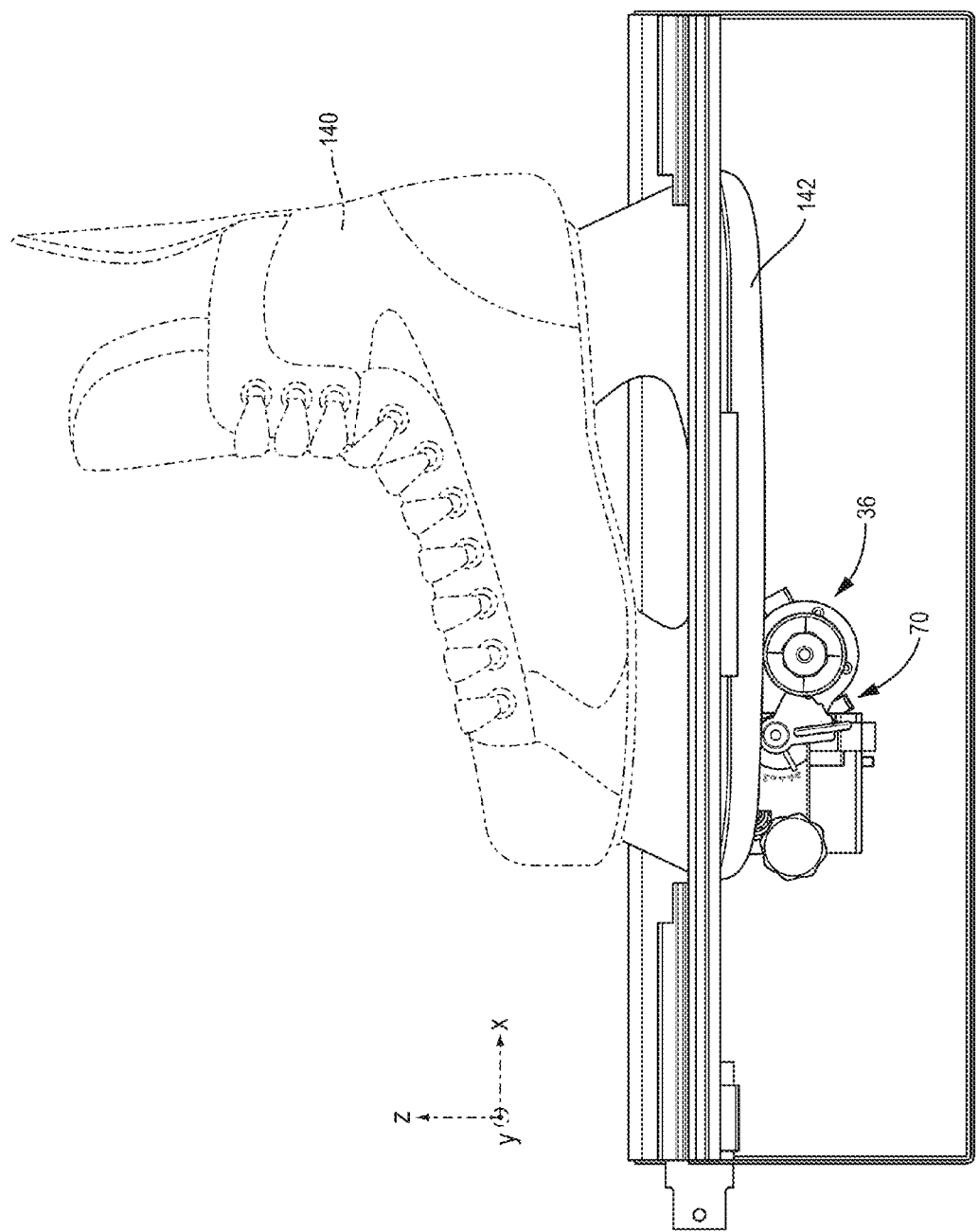

FIGS. 7 and 8 are front views illustrating the above operation. A skate 140 is present and its blade 142 is clamped into a sharpening position in which the lower portion of the blade 142 extends downward through the slot 24 (FIG. 1) into the interior of the sharpener 10. In FIG. 7 the carriage assembly 70 is located at far left, and the grinding wheel 36 is at an upper vertical limit position just off the left (leading) edge of the skate blade 142. FIG. 8 shows the carriage assembly 70 and grinding wheel 36 in the middle of a pass. It can be seen that the grinding wheel 36 has moved downward as it has followed the profile of the blade 142. As mentioned, this left-to-right pass ends with the grinding wheel 36 at the far right, off the right (trailing) edge of the blade 142. Generally multiple passes are used in a sharpening operation for a given blade 142, with the number of passes being determined by the amount of material removal that is necessary to achieve desired sharpness. The sharpener may use both left-to-right and right-to-left passes in sequence, i.e., the grinding wheel 36 travels back and forth in contact with the blade 142 in both directions. Assuming a single home position at one end, in practice each sharpening operation may have a number of two-pass cycles, each including a pass in one direction and a pass in the opposite direction. In alternative embodiments sharpening may occur in only one direction, i.e., the grinding wheel 36 is in contact with the skate blade 142 only for passes in one direction, which alternate with non-sharpening return passes in the other direction.

Figure 9:
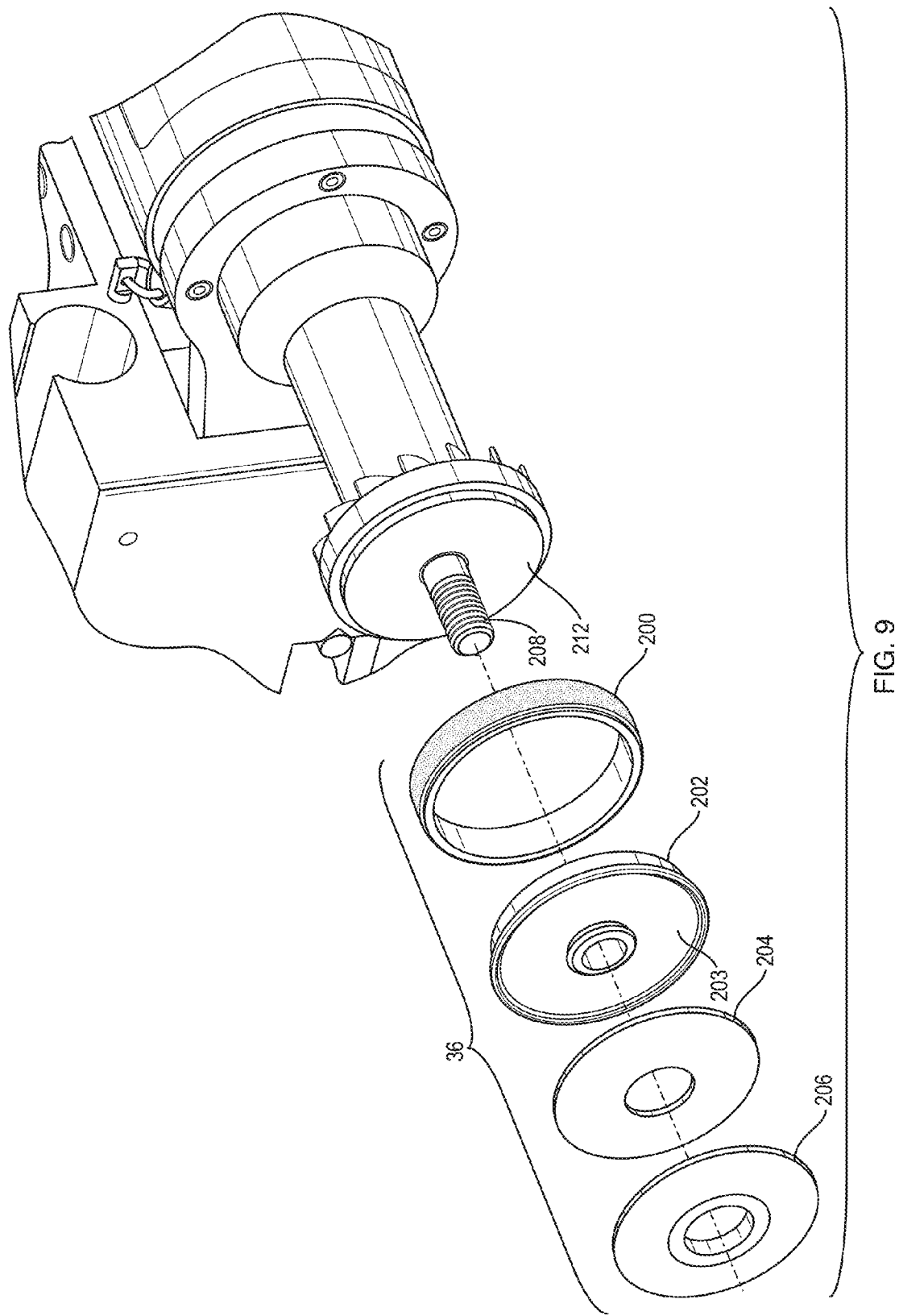
FIG. 9 is an exploded perspective view of a grinding wheel.

FIG. 9 shows details of the grinding wheel 36 in one embodiment. It is a multi-piece removable assembly that includes a metal grinding ring 200 disposed on a rigid hub 202, such as by a press fit. The hub 202 has a shallow front-facing cavity 203 which receives an identification tag 204 and a tag capture disk 206. The identification tag 204 (and an optional graphic label not shown in FIG. 9) is covered by the capture disk 206, which has a snap-fit to the hub 202. The identification tag 204 may be adhered to the hub 202. Once the capture disk 206 is snapped onto the hub 202, disassembly is very difficult. In one embodiment the hub 202 and disk 206 are formed of thermoplastic or similar hard non-metallic material, and may be substantially transparent. The grinding wheel 36 is mounted to an axle 208 of the spindle 82 by a retention nut (not shown) that urges the grinding wheel 36 against a metal arbor 212 that forms part of the spindle 82.

The grinding ring 200 has an abrasive outer surface for removing material from a steel skate blade during operation. In one embodiment the abrasive surface may include a diamond or cubic boron nitride (CBN) coating, deposited by electroplating for example. The grinding ring 200 is preferably of steel or similar rigid, strong metal, and it may be fabricated from steel tubing or bar stock. Although in general the grinding ring 200 may be of any size, it is preferably less than about 100 mm in diameter and even more preferably less than about 50 mm in diameter. Its thickness (radially) is substantially less than its radius, e.g., by a ratio of 1:4 or smaller. The ring shape, as opposed to a disk shape as used in more conventional grinding wheel designs, produces a much lighter grinding wheel 36 which can reduce the effects of wheel imbalance, eccentricity, and non-planarity. Reducing such effects can contribute to a smoother finish on a skate blade and a higher performance skate sharpening.

As shown, both the arbor 212 and hub 202 have shaped outer edges which mate with respective edges of the grinding ring 200. The mating between the arbor 212 and ring 200 is a sliding contact mating that permits mounting and dismounting of the grinding wheel 36 while also providing for heat transfer between the grinding ring 200 and the arbor 212. This relatively tight fit is also responsible for the centering of the grinding wheel. The heat transfer helps dissipate frictional heat generated in the grinding ring 200 as it rotates against a skate blade in operation. Specifically this mating is between a portion of an inner annular surface of the grinding ring 200 and an annular outer rim of the arbor 212. Both the hub 202 and arbor 212 have notches or shoulders on which respective portions of the grinding ring 200 rest. Thus the shoulder portion of the hub 202 extends only partway into the grinding ring 200, so that a remaining part of the grinding ring 200 extends beyond the arbor-facing end of the hub 202 and mates with the shoulder portion of the arbor 212.

The arbor 212 may include vanes or other features to increase its surface area and/or enhance air flow for a desired cooling effect, further promoting heat dissipation and helping to maintain a desired operating temperature of the grinding ring 200 in operation.

One important feature of the grinding ring 200 is its relatively small size, as compared to conventional grinding wheels which may be several inches in diameter for example. Both the small size of the ring (outer diameter) as well as its ring geometry (in contrast to disk geometry of conventional grinding wheels) contribute to advantages as well as challenges. Advantages include low cost and ease of manufacture, so that it can be easily and inexpensively replaced to maintain high-quality sharpening operation. The size and geometry also reduce any contribution of the grinding ring 200 to imbalance and related mechanical imperfections of operation. Balance and related operational characteristics are more heavily influenced by the arbor 212, which is preferably precision-formed and precision-mounted. One challenge of the geometry and size of the grinding ring 200 is heat removal, and this is addressed in part by the heat-conducting mating with the arbor 212 and heat-dissipating features of the arbor 212.

The identification tag 204 has a unique identifier such as a manufacturer's serial number, and when packaged with a grinding wheel 36 into an assembly serves to uniquely identify that assembly including the constituent grinding wheel 36. The identification tag 204 also includes memory capable of persistently storing data items, used for any of a variety of functions such as described further below. The identification tag preferably employs a security mechanism to protect itself against tampering and improper use, including improper manipulation of the contents of the memory. Memory protected in such a manner may be referred to as "secure memory". The serial number should be a read-only value, while the memory is preferably both readable and writeable. As described below, a separate transceiver in the system 10 is capable of exchanging communication signals with the tag 204 for reading and writing data. In one embodiment, so-called "RFID" or radio frequency identification techniques may be employed. Using RFID, the identification tag 204 is read from and written to using radio-frequency electromagnetic waves by an RFID transceiver contained in the sharpening system 10 (described more below). Other types of implementations are possible, including optically interrogated tags and contact-based tags such as an iButton® device.

For security, the identification tag 204 may use an access code that is read by the control unit 32 and validated. The access code can be generated by a cryptographic hash function or other encryption algorithm that takes as input the serial number of the identification tag 204 and a confidential hash key. Using the serial number ensures that the access code created is uniquely paired with a specific identification tag 204. This uniqueness can help prevent misuse that is attempted by copying an access code from one identification tag 204 to another. When the serial number of the other identification tag 204 is encrypted, the result will not match the copied access code, and appropriate action can be taken such as preventing use of the grinding wheel 36 that contains the apparently fraudulent identification tag 204.

Figure 10:
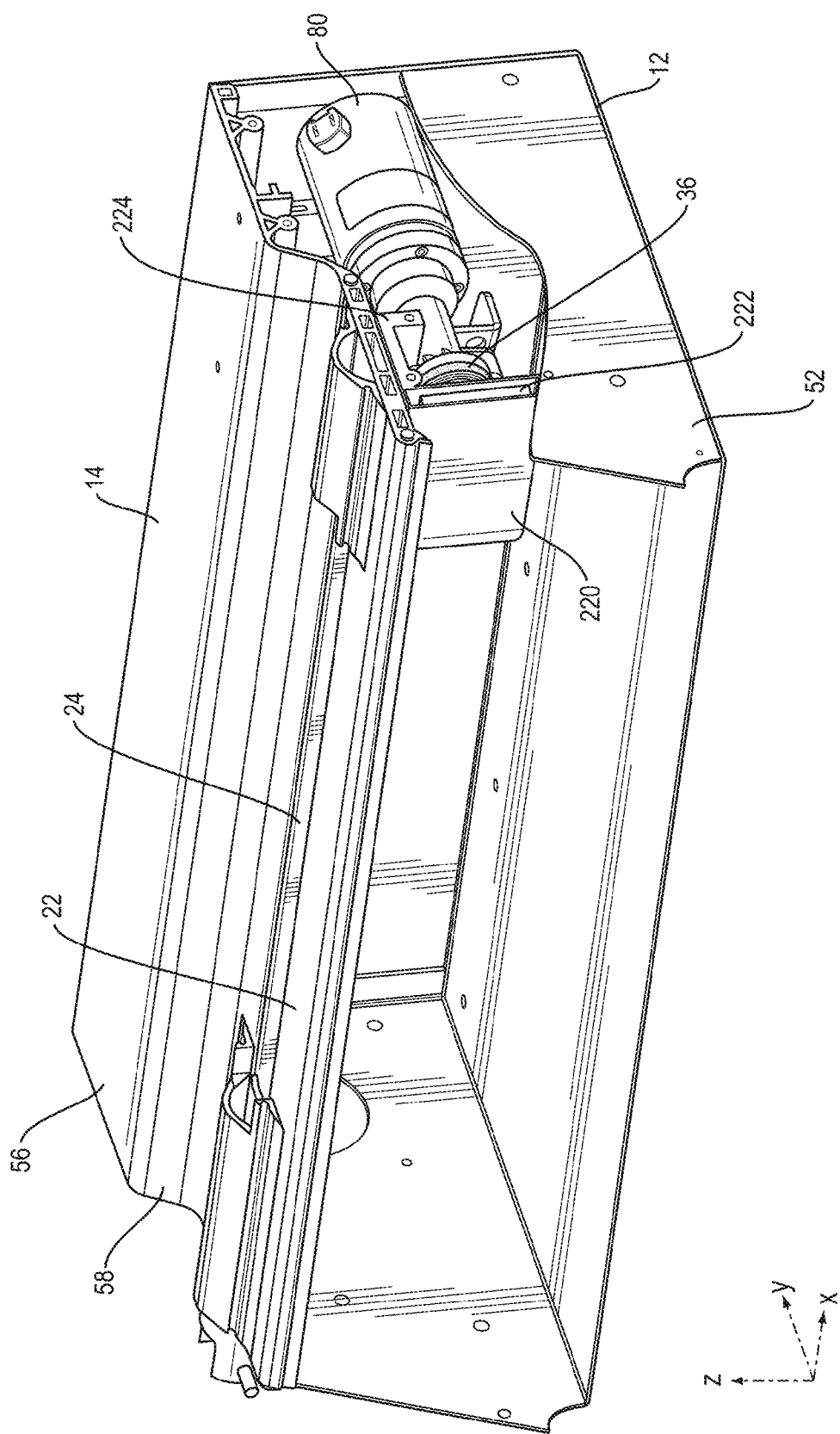
FIG. 10 is a perspective view of an interior of a sharpening system including a carriage assembly.

FIG. 10 shows the sharpener 10 having the carriage 70 located in a "home" position at the far right of the sharpener 10. The right end wall 52 is cut away in this view in order to show pertinent detail. Attached to the right wall 52 is a housing 220 in which an electronic sensor module 222 is mounted. The sensor module 222 is connected by cabling (not shown) to the controller 32 (FIG. 6). In this position the grinding wheel 36 is adjacent to an inner side of the housing 220 and vertically centered on the housing 220 by action of a shoulder member 224 of the housing 220. Additional details of this arrangement are described below.

As mentioned above, the wheel 36 includes an identification tag 204 on which various data may be stored for a variety of purposes. In the illustrated embodiment this tag employs a wireless communication technique such as Radio Frequency Identification (RFID) communications. The sensor module 222 includes an RFID antenna (not shown) which becomes registered or aligned with the identification tag 204 when the grinding wheel 36 is in the illustrated home position, so that the tag 204 may be read from and written to using RFID communications. Generally the RFID antenna has one or more loops of conductive material such as wire or metal etch, with the loops having a circular or other shape (e.g., rectangular). The RFID communications may operate on any of a number of frequencies. Frequencies in common use include 133 kHz (Low Frequency or LF), 13.56 MHz (High Frequency or HF), and 900 MHz (Ultra High Frequency or UHF).

In the illustrated embodiment the identification tag 204 is within the circumference of the circular RFID antenna of the sensor module 222, e.g., concentric with the antenna, during the reading and writing of data from/to the tag 204 as part of operation. By this arrangement the identification tag 204 can be read from and written to even when the grinding wheel 36 is rotating at full speed, which may be between 5000 and 25000 RPM. Reading and writing at full rotational speed has a distinct advantage of allowing the sharpener 10 to sharpen more quickly, because it is not necessary to slow/stop wheel rotation and then bring rotation back up to speed for each read/write operation. As described more below, in one embodiment reading and writing occurs once during each 2-pass cycle, so the time savings is proportional to the number of cycles in a sharpening operation. Additionally, reading and writing at full rotational speed can discourage any tampering with the grinding wheel 36, because it is always moving during the sharpening process. In some embodiments it may be advantageous to maintain rotation but at a reduced rotational speed to improve the read/write communications with the tag 204.

Figure 11:
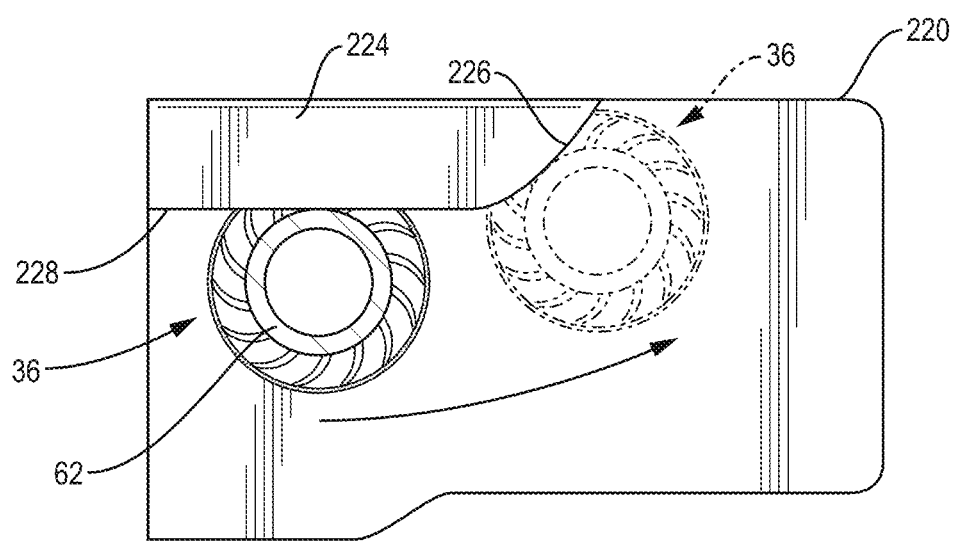
FIG. 11 is a rear view of a rear part of a radio frequency identification (RFID) antenna housing in a sharpening system.

FIG. 11 is a view from inside the sharpener 10 toward the front, showing the inside-facing part of the housing 220 and other details. As shown, the shoulder member 224 has a sloped edge 226 and horizontal edge 228. When the grinding wheel 36 is returning to the home position, moving right-to-left in FIG. 11, it initially is at its vertical limit position as indicated in phantom. The spindle 62 encounters the sloped edge 226 and follows it downward, then rides along the horizontal edge 228. This motion of the spindle 62 brings the wheel 36 into a desired vertical position with respect to the antenna within the housing 220, e.g., aligning the center of the wheel 36 with the center of the antenna. This alignment generally maximizes the RF coupling between the antenna and the tag 204, resulting in robust and accurate transfer of RF signals therebetween.

Figure 12:
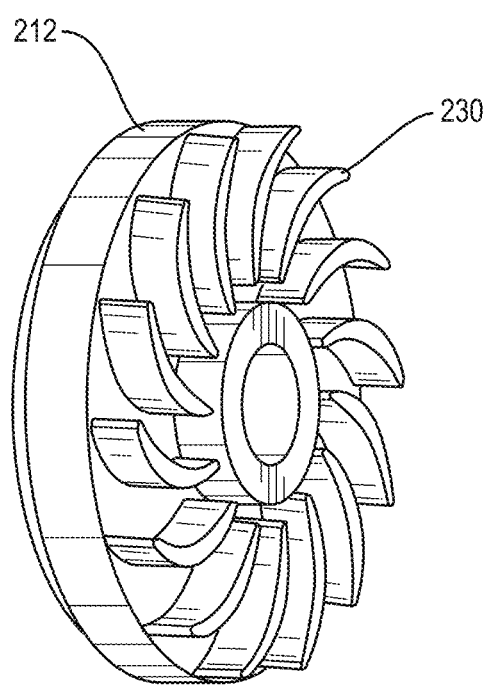
FIG. 12 is a perspective view of an arbor.

FIG. 12 shows the rear face of the arbor 212. It is a unitary component including a set of rearward-facing projections or "vanes" 230, each extending generally radially with slight curvature as shown. With this configuration the arbor 212 creates airflow in the vicinity of the arbor 212 and grinding ring 200, increasing convective heat dissipation from these components over an alternative lacking this feature. It will be appreciated that any of a variety of specific vane configurations may be employed, including non-curved vanes.

Figure 13:
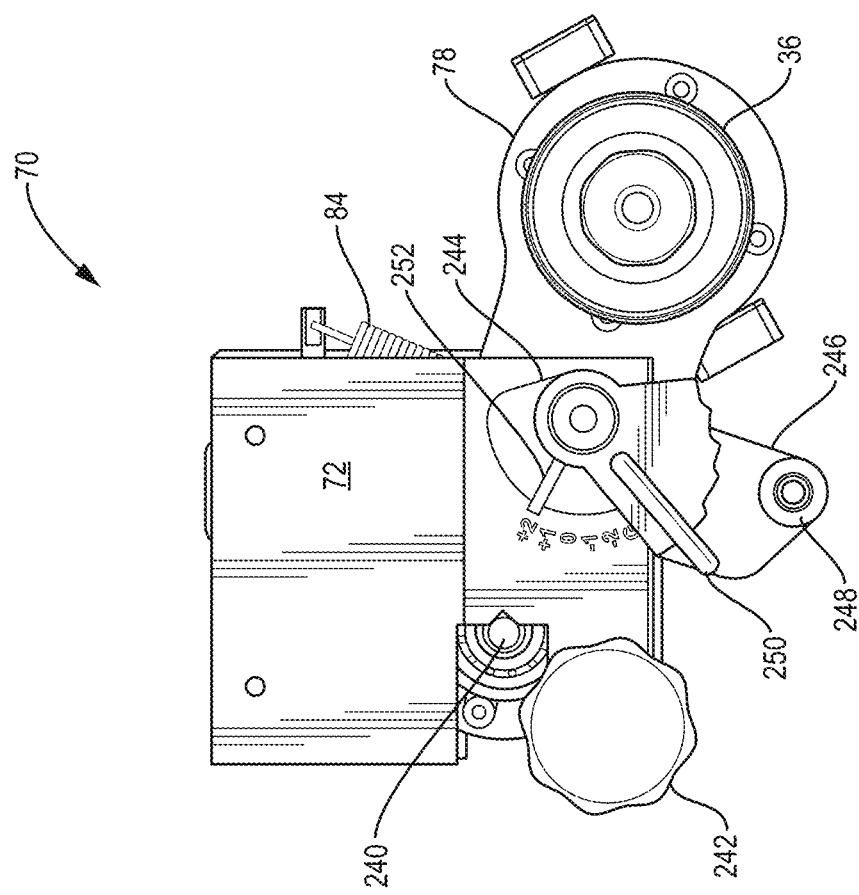
FIG. 13 is a front elevation view of a carriage assembly.

FIG. 13 shows the front of the carriage assembly 70. The motor arm 78 is an oblong member mounted for rotation on a spindle axle 240 at the left side of the carriage 70. A Y-adjustment knob 242 is mounted on a separate Y-adjustment axle below the spindle axle 240. A height adjustment mechanism includes a rotating adjustment member 244 and a bracket 246 extending downward from the motor arm 78 and having a limit peg 248. The adjustment member 244 includes a user handle 250 and a pointer feature 252 having a terminus at an array of numbers arranged on the carriage 70. Its lower edge is scalloped by a series of faces having successively increasing distances from the center of rotation (proceeding clockwise along the edge).

As the adjustment member 244 is turned, it presents different faces of the scalloped lower edge at a rest position of the limit peg 248. When the grinding wheel 36 is clear of the skate blade and the motor arm 78 rotates upward under the action of the spring 84, the upward travel is limited by the limit peg 248 encountering a face of the lower edge of the adjustment member 244. The different faces of the adjustment member 244 are at different radii from the center of rotation of the adjustment member 244, thereby establishing different vertical locations for this rest position of the limit peg 248.

In operation, a user rotates the adjustment member 244 to set a maximum vertical position of the grinding wheel 36. The purpose of this adjustment is to set a vertical travel limit of the grinding wheel 36 when it comes off the edge of the skate blade. This feature helps tailor operation depending on the type of skate being sharpened. Regular ice hockey skates have rounded upturns at each end of the skate blade (e.g. toe or heel), and it is desired that the grinding wheel 36 move upward to follow the upturns. This can be accomplished by having a high maximum vertical position. The blades on so-called "goalie skates" are flatter and it is typically desired that the grinding wheel 36 not move as far upward as it leaves the end of the blade, but rather come off relatively straight. This can be accomplished by adjusting the height limit using the adjustment member 244 to set a lower maximum vertical position.

In FIG. 13, the grinding wheel 36 is shown in a downward position such as it occupies when riding along a skate blade, so the limit peg 248 is well away from the adjustment member 244. It will be appreciated that upward rotation of the motor arm 78, such as occurs when the grinding wheel 36 moves away from the skate blade, rotates the bracket 246 upward so that the limit peg 248 encounters the lower edge of the adjustment member 244.

Figure 14:
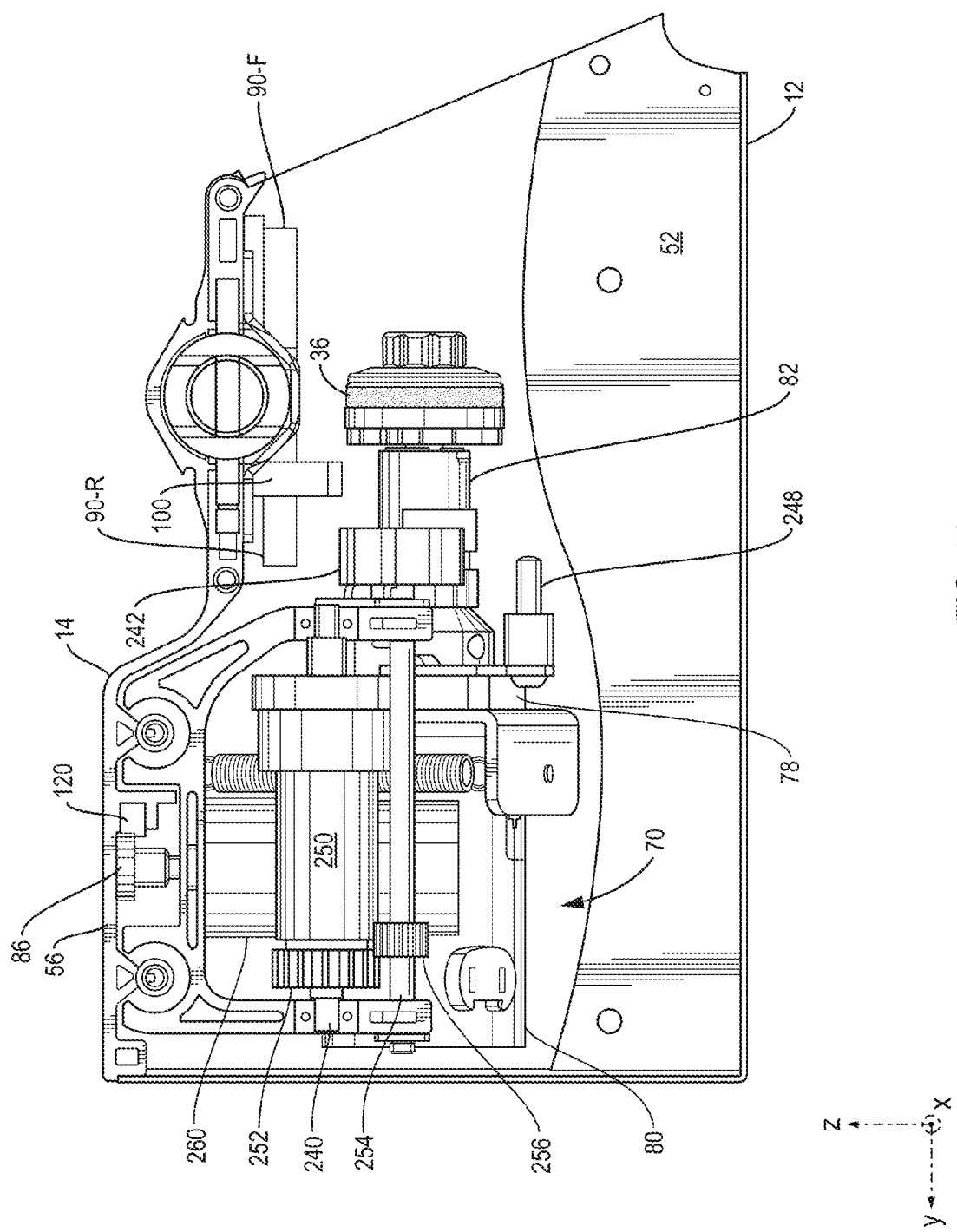
FIG. 14 is a side elevation view of a carriage assembly.

FIG. 14 is a view from the left side of the sharpener 10, with the near end wall 52 partially cut away. This view illustrates several features related in some manner to the compactness of the grinding wheel 36, i.e., its smaller diameter relative to that of the grinding wheel motor 80 (FIG. 4). When conventional larger grinding wheels are used, there is inherently greater vertical space within which other mechanical components may be mounted, such as the grinding wheel motor, clamping jaws for the skate blade, etc. Using the compact grinding wheel 36 enables a corresponding compactness in the overall skate sharpener 10, which is generally advantageous but also requires that more attention be paid to the design and organization of other mechanical features.

One feature visible in FIG. 14 is the height difference between the rear shelf 56 and the lower front platform 22 of the chassis 14. The relative height of the shelf 56 provides clearance for the carriage assembly 72 and the components it carries, including the grinding wheel motor 80 with its vertical movement on the motor arm 78 (see FIG. 4). The lower platform 22 is closer to the grinding wheel 36. The jaws 90 are located below the platform portion 22, even closer to the grinding wheel 36 to permit the skate blade to be retained at a sufficiently low position that it can be contacted by the grinding wheel 36 in operation. The above-described protective function of the jaw guard 100 can also be appreciated in this view—the spacing between this component and the spindle 82 is smaller than the spacing between the grinding wheel 36 and the jaws 90.

Another pertinent feature relates to a Y-adjustment mechanism permitting fine adjustment of the position of the grinding wheel 36 to align it with a retained skate blade in the X-Z plane (which is perpendicular to the page of FIG. 14). The grinding wheel 36 is mechanically coupled to the carriage 70 by a series of components including the spindle 82, motor 80, and motor arm 78, which is mounted to a spindle 250 having a spindle axle 240 mechanically fixed to the carriage 70. The spindle 250 includes an interior mechanism causing fine translational movement (horizontally in FIG. 14) in response to rotation of a spindle gear 252. In some embodiments, the spindle 250 is located above a nominal position of the grinding wheel 36, creating a desired arc of movement of the motor arm 78 and direction of force between the grinding wheel 36 and the skate blade. In order to actuate the Y-adjust mechanism of the spindle 250, an adjustment axle 254 on which the adjustment knob 242 is mounted is located below the spindle 250 and has a gear 256 engaging the spindle gear 252. This lower position enables a user to reach into the unit (from the front opening which is to the right in FIG. 14) and rotate the adjustment knob 242 with their fingers, clearing the underside of the front platform portion 22 of the chassis 14.

FIG. 14 also shows the above-mentioned carriage motor 260 that drives the pinion gear 87 in engagement with the rack 120.

Use of Identification Tag 204

The grinding wheel 36 utilizes the identification tag 204 to carry important information and provide it to the control unit 32 of the sharpener 10. The information carried by the tag 204 can be used to improve sharpening operation and reduce costs associated with the skate sharpener 10.

Accurate and repeatable skate sharpening is obtained when the grinding wheel 36 is in good condition (e.g. running true, not excessively worn, not damaged). One of the limitations of existing sharpeners is that there is no indicator for the user that alerts them when the grinding wheel is not in good condition. Generally the user must make a judgment call on when to retire a grinding wheel. This may occur, for example, in response to a bad skating experience with skates that were sharpened with a grinding wheel that is no longer in good condition.

The disclosed sharpener 10 can use the data-carrying ability of the grinding wheel 36 to track usage, and employ the usage information in some way to promote delivery of consistent high quality sharpening. Generally this will involve comparing actual usage to a usage limit that has been predetermined as a dividing point between high quality sharpening and unacceptably low quality sharpening. When the usage limit is reached, some action is taken. For example, the control unit 32 may provide an indication to a user via the user interface display panel 34. It may also prevent further use of the grinding wheel 36, i.e., refrain from performing any passes with a wheel whose usage has reached the limit, even if such continued use has been requested by a user.

In one embodiment, the above usage tracking may be realized by initially loading the usage limit value onto the tag 204 and then subtracting or "debiting" the stored value as the grinding wheel 36 is used. The usage limit may be deemed to have been reached when the stored value reaches a predefined number such as zero. Generally the usage tracking and usage limit may be specified in any of a variety of ways, including a count of passes or cycles as has been mentioned, or alternatively by counting operating time (tracking the operating time for each sharpening and accumulating the time values over a period of successive sharpenings). If the usage limit value is specified as a maximum number of passes, then the value is decremented by two for each 2-pass cycle of the grinding wheel 36 over a skate blade during sharpening. In one embodiment, this decrementing can take place once each cycle, with the grinding wheel 36 passing through the home position (FIG. 8) to enable the required RFID communications. In another embodiment, the updating may occur only once for a multi-pass sharpening operation. For example, once a number of passes has been specified (either by default or by actual user selection), the number of passes may be updated by the system immediately after the machine reads the tag 204 and just before the carriage motor 260 begins rotating. If the stored value were updated less frequently or at a different time, there may be more opportunity for a user to somehow "trick" the sharpener 10 into using a grinding wheel 36 longer than its useful life, which would jeopardize the quality of the skate sharpening.

A specific example is now provided for illustration. It is assumed that the useful lifetime of a grinding wheel 36 is on the order of 160 passes. This translates to approximately 10 sessions of sharpening a pair of skates if an average of 4 cycles (8 passes) is used per skate (8*2*10=160).

In a given embodiment, usage may be tracked in units of passes, cycles, blades sharpened (assuming some fixed or limited number of passes per blade), time, or some other scheme. The UI display 34 may be used to display remaining usable life for a grinding wheel 36 to the user. For example, it may be displayed as a fraction or percentage, or as more general ranges which could be indicated by colored indicators, for example—e.g., green for high remaining lifetime, white or other neutral color for intermediate, and red for low remaining lifetime. In one embodiment a linear array of indicators may be used, and indicators successively extinguished from one end as usage increases, and the end-of-life indicated by no indicators being lit.

Since there will be user-to-user variability in how many passes are done for a skate sharpening, the system may alert a user when the number of cycles needed to complete a sharpening exceed the number of cycles of remaining life of the grinding wheel 36. The alert may be provided, for example, by dimming or flashing a set of indicators, and/or by stopping a sharpening that is in progress or preventing a new sharpening from beginning Generally, it is desired that the display technique enable a user to accurately plan for use and avoid running out of usable grinding wheel lifetime in the middle of a sharpening Beyond the usage tracking information, the tag 204 may also be used to carry system setup parameters that the control unit 32 can read and then apply to operation. This programming-type approach can enable a single sharpener 10 having a generalized design to be used in a wide variety of ways. For example, the tag 204 may contain parameters for the rotational speed of the grinding wheel motor 80; the speed of translation of the carriage assembly 70 across the skate blade; and the magnitude of a normal grinding force (i.e., the force applied by the grinding wheel 36 in a direction normal to the bottom face of the skate blade 40). Employing customizable settings in this manner can support variability in the materials, diameters, and grits used for different grinding wheels 36. Larger wheel diameters for different skates, or different grits for different skate steels or surface finishes, will generally require different system settings (grinding wheel RPM and translation speed) for optimized use. In operation, the control unit 32 can read the parameters from the tag 204 and then apply the parameters prior to beginning a sharpening operation, such as by programming the appropriate controllers 132 (FIG. 6). This programmability may also promote compatibility as designs of the grinding wheels 36 evolve over time. For example, if an innovation in grinding wheel abrasives happens in 5 years and this requires different system settings, the wheels produced in 5 years will store corresponding values of operating parameters to enable existing sharpener systems 10 to properly adjust themselves to produce an optimal sharpening.

The identification tag 204 may also store user-specific settings to be used for sharpening operations, such as a default number of passes for a skate sharpening. The control unit 32 can read such values and then use them unless they are overridden by a specific current selection by the user. One user may sharpen relatively frequently and typically use a small number of passes, such as two, while another user may sharpen less frequently and typically use a larger number of passes, such as eight. The user interface preferably would enable a user to modify or update any such persistently stored values. Saving user-specific values on the grinding wheel 36 also enhances "portability" of the customization. A user can carry their own grinding wheel 36 and mount it for use in different sharpener systems 10 at different locations while still obtaining the same user-specific operation. For example, an organization such as a hockey club or rink operator can provide access to a sharpener system 10 and allow users to swap grinding wheels 36, so that each user receives a desired user-specific experience.

The sharpener system 10 may also have features for defeating counterfeiting or certain tampering with tags 204. For example, it might record the unique tag identifiers (e.g., tag serial numbers) for every tag 204 that has been used over some interval on that sharpener, as well as recording the number of passes that were last seen on the tag 204. If there is ever a time when a sharpener 10 sees a grinding wheel 36 that it has seen before but having remaining pass count greater than the number of remaining passes last seen on that wheel, the sharpener 10 could deem the grinding wheel 36 to be a counterfeit or tampered with and prevent its use. This might be done to insure that only grinding wheels 36 of sufficient quality are used, to obtain good sharpening results and avoid any unsafe conditions that could occur by using a defective or inferior grinding wheel 36. The system 10 may store the most recent passes remaining count as individual numbers or as percentages similar to the way the system displays the grinding wheel remaining life to the user.

Yet another possibility is for the tag 204 to store system fault data, i.e., data describing fault conditions that have occurred during a sharpening operation. This can help users interact with technical service to diagnose problems they may be having with their machine. A manufacturer or service organization might request that the user send a grinding wheel 36 to that organization for review. The grinding wheel is smaller and thus far cheaper and convenient to send than is the entire system 10. At the manufacturer or service organization, technicians can read fault data such as fault codes from the wheel 36. In another embodiment, the identification tag 204 may be compatible with readers such as near-field communications (NFC) readers such as used on smart phones and similar small computing devices. When the user experiences a system fault, the user can remove the grinding wheel 36 and place it near the computing device. The device might immediately launch an application or navigate to a particular web site to provide information to the user about the particular fault that is identified by the fault data stored on the tag 204. Another use for this type of interface is for repurchasing grinding wheels 36. The application or website launched by the device may provide product ordering functionality, enabling a user to easily obtain replacement grinding wheels 36 as existing grinding wheels are used up.

Figure 15:
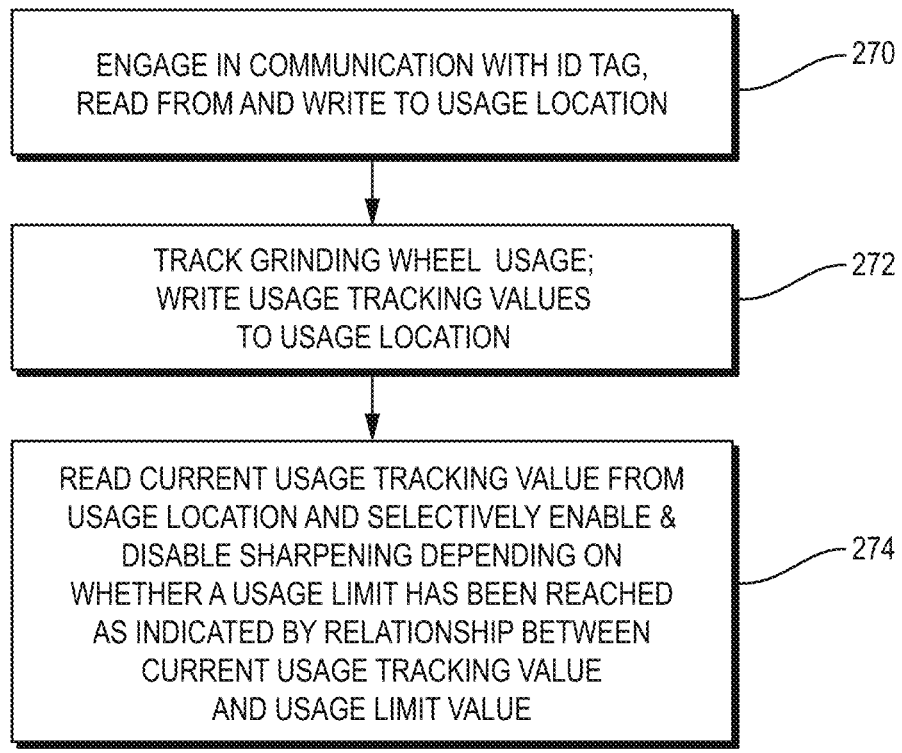
FIG. 15 is a flow diagram of operation of a sharpening system.

FIG. 15 provides a high-level description of system operation with respect to the identification tag 204. At 270, the system 10 engages in communication with the identification tag 204 which is attached to a grinding wheel 36 mounted in the sharpening system 10. As described above, the identification tag 204 has secure memory including a usage location for persistently and securely storing a usage tracking value. The communication both reads from and writes to the usage location.

At 272, the system 10 tracks usage of the grinding wheel 36 for sharpening operations and writes updated usage tracking values to the usage location as the grinding wheel 36 is used for the sharpening operations. Usage may be tracked by counting passes, for example, in which case it may be convenient for the usage tracking value to be expressed as a pass count. The usage value may directly indicate an amount of usage that has occurred, e.g., as an increasing count of passes, or it may be directly indicate an amount of usage remaining, e.g., as a decreasing count of passes.

At 274, the system 10 reads a current usage tracking value from the usage location and selectively enables and disables sharpening depending on whether a usage limit has been reached, as indicated by a relationship between the current usage tracking value and a predetermined usage limit value. When a decreasing or decremented usage value is used to indicate an amount of usage remaining, then the predetermined usage limit value can be used as the starting usage value, and the usage limit is reached when the usage value is decremented to zero.

Figure 16:
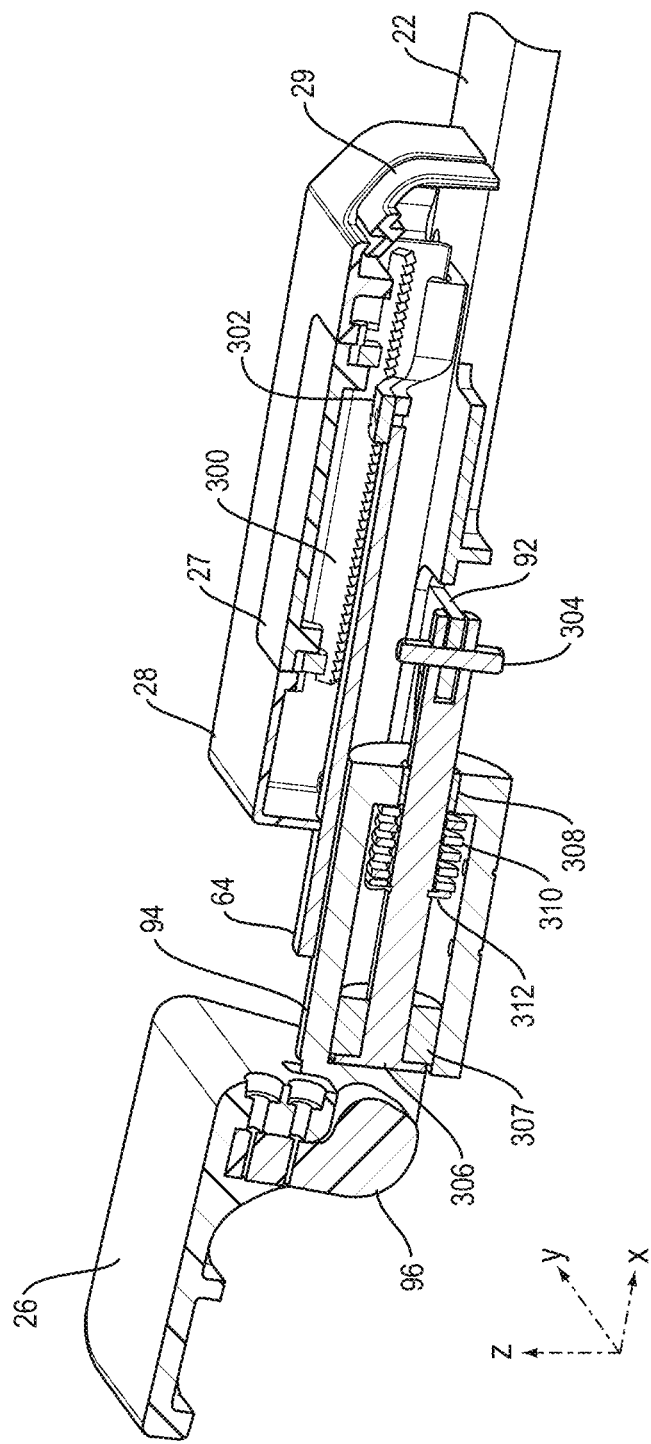
FIG. 16 is a section view of the platform area of the chassis.

FIG. 16 is a section view of the platform area 22 of chassis 14. The clamp paddle 26 and left slot cover 28 (FIG. 1) are shown, as well as various components of the blade clamping mechanism described above with reference to FIG. 5.

Referring first to the slot cover 28, the button 27 is mounted for rocking on a horizontal axis and has a downward-extending rack 300 at the rear. The rack 300 engages a pawl 302 attached to the arch 64. A spring (not shown) biases the button 27 so that its top is co-planar with the top of the slot cover 28 and the rack 300 engages the pawl 302, locking the slot cover 28 in place. In use, a user depresses a front part of the button 27 (see FIG. 1), lifting the rack 300 and enabling the slot cover 28 to slide left and right on the arch 64. The left slot cover 28 travels between a far left position and a more rightward position in which it covers the left end of the slot 24. A limit for the far left position is established by the rightmost wall of the slot cover 28 hitting a rightward wall or face of the arch 64 adjacent the platform 22. A limit for the rightward position is established by the left wall of the slot cover 28 hitting the pawl 302. There is a similar but mirrored arrangement for the right slot cover 28. Additional details of the slot cover 28 are given below.

Referring next to the blade clamping mechanism, a vertex portion of the U-shaped pull rod fork 92 is shown, along with a pin 304 securing it to the pull rod 102. The pull rod 102 extends through the clamp cylinder 94, terminating at a piston head 306. The pull rod 102 is disposed within bushings 307, 308. A spring 310 is disposed between one end of the body of the clamp cylinder 94 and an external retaining ring 312 on the pull rod 102.

When the clamp paddle 26 is in the position shown, the cam 96 presents a lower-radius face to the piston 306, and the spring 310 urges the pull rod 102 to a maximum retracted position, to the left in FIG. 16. The pull rod fork 92 is under tension and pulls the clamp jaws 90 (FIG. 5) in a closed position. If a skate blade is present then the clamp jaws 90 clamp the skate blade into place with a force geometrically related to the force created by the spring 310. This arrangement is referred to as a biasing mechanism and the force as a bias force.

A user opens the clamp jaws 90 by pushing downward on an outer part of the paddle 26, rotating it counterclockwise in the view of FIG. 16. The cam 96 has increasing radius in this direction and pushes the piston head 306 rightward against the force of the spring 310. This action releases the clamping force between the jaws 90 and skate blade if present, and pushes the pull rod fork 92 rightward pushing the jaws 90 apart. The jaws are fully open when a maximum-radius part of the cam 96 is contacting the piston head 306. This maximum-radius location can generally be anywhere in a range of about 10 degrees to 90 degrees from the closed position of FIG. 16. For smooth operation and good mechanical advantage it may preferably be somewhere in the smaller range of 40 degrees to 75 degrees. In one embodiment it is located at 60 degrees. As mentioned above, a configuration providing a detent action may be used. For example, the cam 96 may have a slightly flattened area at maximum-radius location for a slight detent action.

Figure 17:
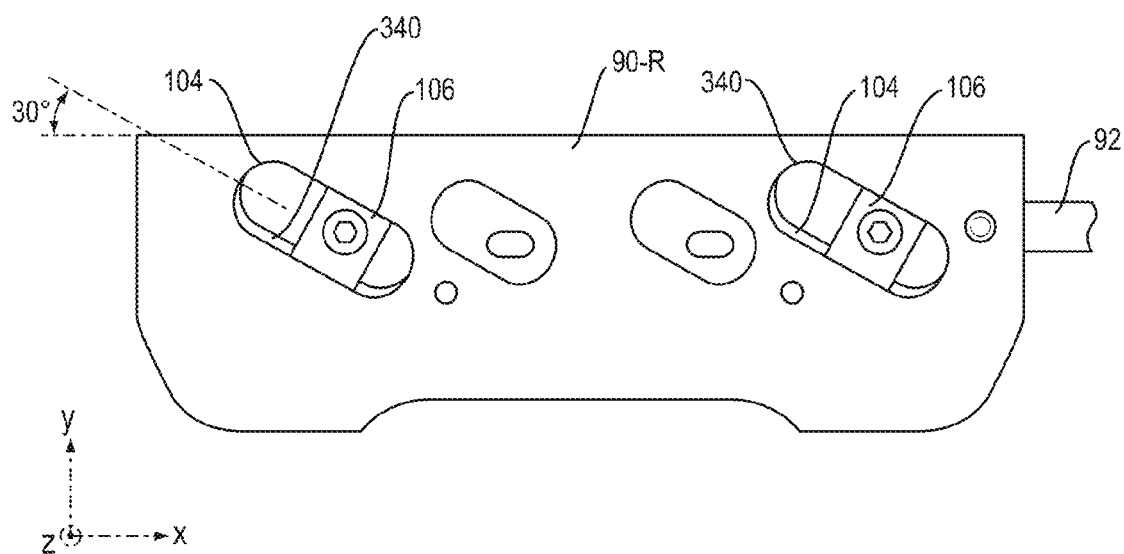
FIGS. 17 and 18 are plan views of clamping jaws.
Figure 18:
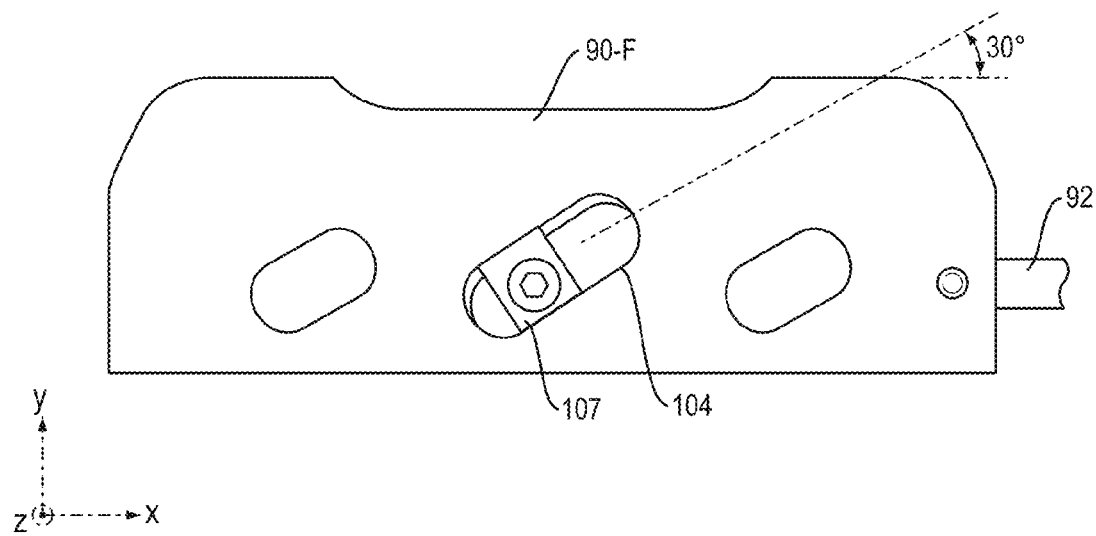
Figure 19:
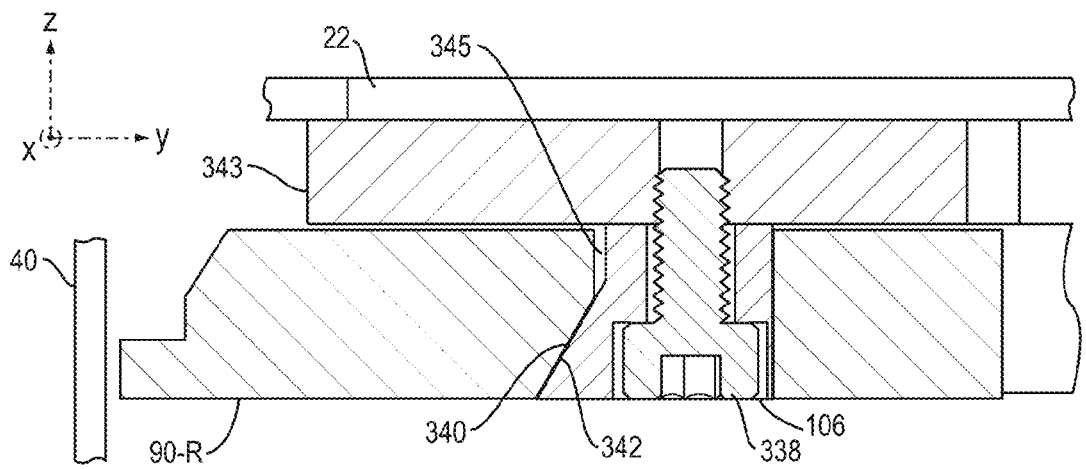
FIGS. 19, 20 and 21 are section views of clamping jaws and guide blocks.
Figure 20:
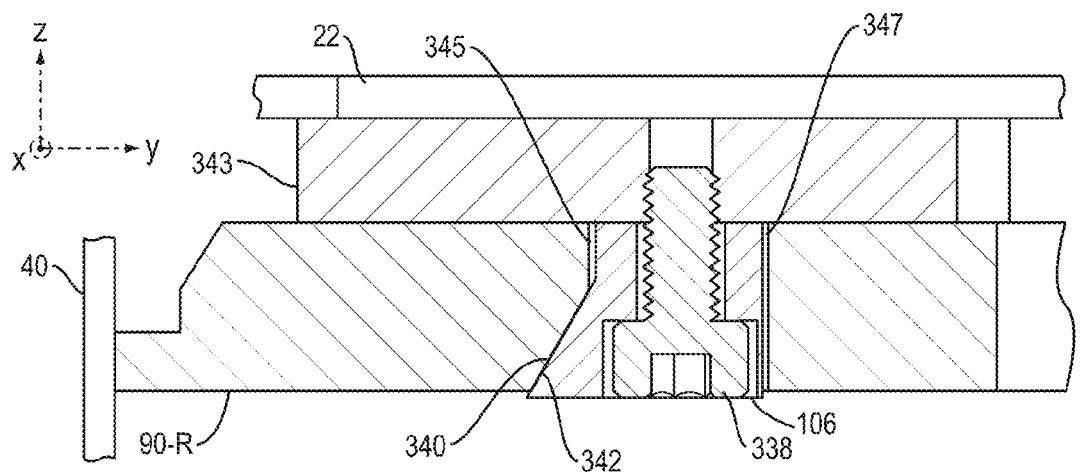
Figure 21:
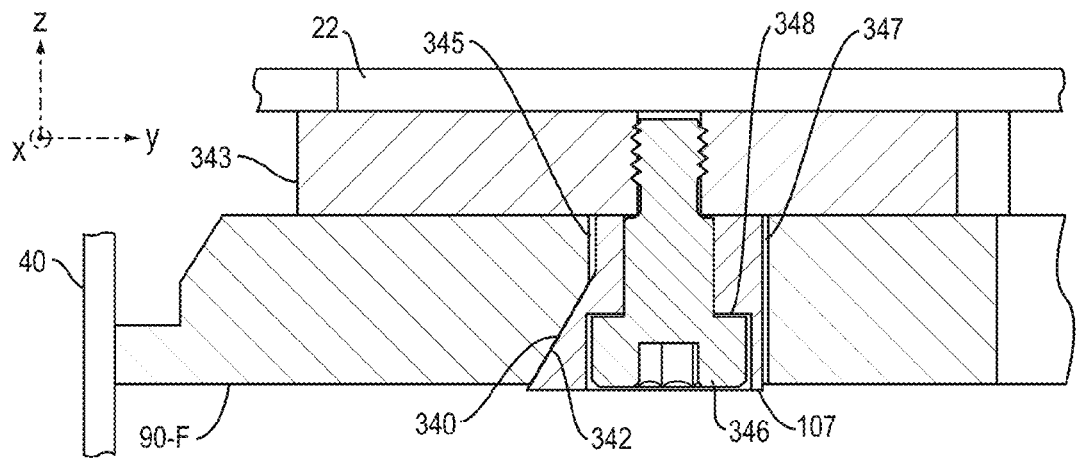

FIGS. 17 through 21 show details of the jaws 90 including connections to respective ends of the pull rod fork 92. FIGS. 17 and 18 show plan views of the bottoms of the rear and front jaws 90-R, 90-F respectively. FIGS. 19 and 20 show sections through a guide slot 104 and guide block 106 of the rear jaw 90-R, and FIG. 21 shows a section through a guide slot 104 and guide block 107 of the front jaw 90-F.

FIG. 17 shows the use of two guide blocks 106 at respective endmost slots 104 for the rear jaw 90-R. The slots 104 are oriented at approximately 30 degrees with respect to the long axis of the jaws 90 (X direction). In response to force exerted by the pull rod fork 92, the jaw 90-R slides along the guide blocks 106. When opening, the rear jaw 90-R moves upward and to the left in the view of FIG. 17, and when closing it moves in the opposite direction. The rear jaw 90-R maintains a fixed orientation substantially along the X axis. It establishes the orientation of the clamped skate blade, which should be highly co-planar with the X-Z plane of movement of the grinding wheel 36.

As shown in FIG. 18, the front jaw 90-F has a generally symmetrical configuration with respect to the rear jaw 90-R, and it moves symmetrically as well, i.e., downward and to the left when opening in the view of FIG. 18. However, the front jaw 90-F is secured with only one guide block 107, located in the center guide slot 104. As described more below, the guide block 107 is mounted in a manner permitting slight pivoting, while the guide blocks 106 for rear jaw 90-R are not. Thus, the front jaw 90-F also rotates slightly about the Z-direction axis of the single central guide block 107. This enables the front jaw 90-F to conform its orientation to that of the rear jaw 90-R when a skate blade is clamped between them. It will be appreciated that this configuration avoids issues that could occur if the front jaw 90-F had an orientation that was fixed but slightly different from that of the rear jaw 90-R due to normal mechanical tolerances. These issues include mechanical binding, uneven force across faces of the jaws (higher at one end than at the other), as well as inaccuracy in the orientation of the skate blade, adversely affecting sharpening quality. The illustrated configuration avoids these issues by allowing the rear jaw 90-R to serve as a mechanical reference, and the front jaw 90-F to conform itself to that reference.

FIGS. 19 through 21 illustrate certain functionality provided by the configuration of a guide slot 104 (i.e., of its surrounding walls) and the guide blocks 106, 107. As shown, the jaws 90 are spaced from the platform 22 by respective spacer blocks 343 which are rigidly secured to the underside of the platform 22. The jaws 90 and guide blocks 106, 107 have a configuration that provides for spacing the jaws 90 slightly from the respective spacer blocks 343, enabling the jaws 90 to slide easily between open and closed positions. The configuration also provides for closing this spacing when the jaws 90 are brought into the closed position, so that they rest flush against the spacer blocks 343. This action make the jaw positioning precise and accurate. It also prevents the jaws 90 from tilting about their longitudinal axes, which would tend to occur if the space were not closed up as the jaws 90 are tightened against the skate blade 40. Maintaining a predictable flat orientation of the jaws 90 provides for greater accuracy in the positioning of the clamped skate blade 40.

FIGS. 19 and 20 show details for the rear jaw 90-R. The guide blocks 106 for the rear jaw 90-R are fastened to the spacer block 343 by bolts 338. The jaw 90-R and guide block 106 have respective sloped or angled surfaces 340, 342 contacting each other. The jaw surface 340 is one side wall of the guide slot 104 (FIG. 17) in which the guide block 106 is located. FIG. 19 is a section view showing these surfaces 340, 342 as lines at the intersection with the Y-Z plane of the paper. Referring back to FIG. 17, the surfaces 340, 342 are also angled in the direction of the guide slot 104, which corresponds to a plane through the paper of FIG. 19, tilted about 30 degrees to the left of X-direction normal. In the view of FIG. 19, the front of the jaw 90-R and skate blade 40 are at the left. The jaw 90-R is pulled in the X direction out of the paper to be closed, and pushed in the opposite direction to be opened. The pulling and pushing cause corresponding leftward (closing) and rightward (opening) motion by action of the angled guide slots 104.

FIG. 19 shows that the combination of the thickness of the rear jaw 90-R, the width of the guide slot 104, and the height and width of the guide block 106 is such that the top of the jaw 90-R is slightly spaced from the bottom of the spacer block 343 in the illustrated position. This is a first condition in which the jaw 90-R is slack, i.e., not exerting a clamping force. This could be either a fully or partially open position. The jaw 90-R rests relatively loosely on the guide block 106 and is able to slide thereon without interfering contact with the spacer block 343. There is a slight space 345 between the jaw 90-R and guide block 106 as shown.

FIG. 20 is a similar view as FIG. 19 but in a second condition in which the rear jaw 90-R is pulled tightly by the pull rod fork 92 (FIG. 5) and exerting a clamping force on the skate blade 40. As the jaw 90-R encounters the skate blade 40 it experiences a rightward force causing it to ride up the surface 342 of the guide block 106 until the top of the jaw 90-R hits the bottom of the spacer block 343. This movement closes the space 345 and opens a separate space 347 on the other side of the guide block 106. Because the surfaces 340, 342 have precisely the same slope, the jaw 90-R automatically assumes a position in which its upper surface is flush against the bottom surface of the spacer block 343. As the motion ceases, the combined forces of the pull rod fork 92 and the skate blade 40 press and hold the jaw 90-R at this upward position, tight against the guide block 106. This action occurs consistently whenever the jaw 90-R is closed, and thus the rear jaw 90-R and skate blade 40 are consistently positioned.

The above motion reverses when the jaws 90 are opened. As the rear jaw 90-R is pushed in the X direction, clamping tension is released and it slides downward in the Z direction, closing the space 347 and returning to the position of FIG. 19 The configuration providing the space 347 in the closed position of FIG. 20 also provides for the slight looseness of the jaw 90-R that permits it to slide easily when slack.

FIG. 21 is an analogous view to that of FIG. 20 but for the front jaw 90-F, which is secured via only one guide block 107 as described above. The configuration and operation are essentially the same as for the rear jaw 90-R—the front jaw 90-F is pushed against the spacer block 343 and guide block 107 in the same manner, and has the same configuration providing for spaces 345 and 347. However, the guide block 107 is secured to the spacer block using a shoulder screw 346 in a tightly toleranced counter-bored hole of the guide block 107. The shoulder screw 346 and counter-bored hole of the guide block 107 are sized to create a slight gap 348, so that the guide block 107 is not secured tightly to the spacer block 343. Thus, the guide block 107 is free to rotate slightly about the Z-direction axis of the shoulder screw 346 to provide the above-described rotational compliance of the front jaw 90-F.

In the illustrated embodiment as described above with reference to FIGS. 19 through 21, the jaw closing direction (left or right) is perpendicular to the direction of the actuating force (out of the paper), and the slots 104 are angled accordingly to translate the actuating force to the clamping force. Also, the actuating force is a pulling force, essentially pulling each jaw 90 up the surface 342 of the guide blocks 106, 107. It will be appreciated that in alternative embodiments other configurations may be used, depending in part on the relative locations of the jaws and the force-generating actuator as well as the nature of the force as either compressing or tensioning the jaws. In particular, the slots 104 may be oriented at angles other than 30 degrees. Also, in the illustrated embodiment the jaw 90 is slightly thinner than the height of the guide block 106, but this is not essential.

In the illustrated embodiment the jaws 90 are urged against a lower or bottom surface of the spacer blocks 343, which are fixedly secured to the underside of the platform 22 of the chassis 14. More generally the jaws 90 are urged against a surface that is in some manner referenced to the chassis 14, i.e., having a fixed position with respect to the chassis 14. In an alternative embodiment, the jaws 90 might be secured directly to a surface of the chassis 14 itself, such as the bottom surface.

FIG. 22 is a bottom view of a slot cover 28 and an arch 64 on which it is captured. The bottom of the button 27 is visible, including the rack 300 that moves in and out of the page in this view when the button 27 is operated as described above. The slot cover 28 is retained on the arch 64 by a latch-like rail mechanism including inner edges 318 of the slot cover 18 that fit within corresponding elongated grooves on the upper surface of the arch 64 where the central rounded portion 319 meets the lateral flat portions 321.

In the illustrated embodiment, the bumper 29 is attached to the body of the slot cover 28 (at lower left corner in this view). The attachment is with a pin or similar fastener 320 that permits the bumper 29 to rotate. A face portion 322 contacts a skate blade holder in operation as described above (FIG. 1 and related description). Another portion 324 extends to an actuation lever 326 of a limit switch 328. The bumper 29 is biased (counterclockwise in this view) by a spring 330. The limit switch 328 is wired to the controller 32 (FIG. 6) to enable the controller 32 to sense its electrical state (open or closed). The wires are omitted in FIG. 22 for ease of illustration.

In operation, the limit switch 328 is electrically open by default, due to the mechanical biasing action of the spring 330. When the face portion 322 of the bumper 29 is depressed, the bumper 29 rotates (clockwise in this view) and the arm 324 depresses the limit switch lever 326, electrically closing the limit switch 328. The state of the limit switch 328 as open or closed is sensed by the controller 32. In one embodiment, sharpening operation is permitted only when the limit switch 328 is sensed as closed, which normally occurs when a skate blade is clamped in position and the slot covers 28 have been moved inward to contact the skate blade holder. In these operating positions the slot covers 28 cover the outer ends of the slot 24 that would otherwise be open. This prevents the introduction of any objects through the outer ends of the slot 24, where such objects might harmfully contact the rotating grinding wheel 36 as it moves along the slot 24 during a sharpening operation. If the limit switch 328 of either slot cover 28 is sensed as open, which normally occurs when either a skate or skate blade holder is not present or both slot covers 28 have not been moved inward to their operating positions, the controller 32 prevents sharpening operation, i.e., provides no electrical drive to the grinding wheel motor 80 and the carriage motor 260. With these motors not rotating, it is safer to introduce objects (such as a skate blade during mounting, for example) into the slot 24.

There are various alternatives to the configuration described above. An alternative to the bumper 29 may be a piston-like mechanism that moves linearly to actuate a switch, instead of rotating about a fixed pivot point as in the above. It is not necessary to use a limit switch with an actuation lever—in an alternative arrangement the bumper 29 (or analogous member) may directly push on the button of a limit switch. Also, in some embodiments a separate spring 330 may not be required. It may be possible to rely on the spring of a limit switch to provide a bias or return force. However, it may be desirable to use a separate spring to provide for adjustment of either/both the range of motion and actuation force of the bumper.

In yet another alternative, a contactless switch such as an optical emitter-detector pair could be used, with the skate or skate blade holder breaking the optical path to trigger the switch.

In the illustrated embodiment the slot covers 28 are affixed and always present, but in an alternative embodiment they could be separate components that are placed and locked onto the ends of the skate or skate blade holder by the user prior to sharpening. Also, while in the illustrated embodiment the slot covers 28 move by sliding, they could alternatively move by rotating on a hinge, telescoping, or rolling out (like a breadbox or garage door).

FIG. 23 is an end view of the carriage assembly 70, similar to FIG. 14 but showing a section view at the location of the pivot spindle 240. Certain details are shown more clearly in the close-up view of FIG. 24.

The pivot spindle 240 is secured at each end to the carriage 72. A pivot section 400 of the motor arm 78 is mounted on the pivot spindle 240 by a combination of bearings 402, 404 and bushings 406, 408. Shown on the right in this view is a spring 410 disposed in compression between the front wall of the carriage 72 and an inner race 412 of the bearing 404. Shown on the left is the spindle gear 252 which is disposed on a hub or nut 414 having screw threading engaging corresponding screw threading on the pivot spindle 240. It will be appreciated that the gear and threading features may be integrated into a single component as an alternative. Arranged between the nut 414 and an inner race 416 of the bearing 402 is a washer 418 and a collar portion 420 of the bushing 406, including a detent mechanism as described below.

The mounting of the motor arm 78 on the bearings 402, 404 permits the motor arm 78 to pivot about the pivot spindle 240 so that the grinding wheel 36 can follow the profile of the bottom face of the skate blade during sharpening (as described above with reference to FIGS. 7 and 8). The bushings 406, 408 provide for low-friction transverse (Y-axis) movement of the motor arm 78 (left to right in FIG. 23). The spring 410 provides a biasing force against a side face of the inner race 412 of the bearing 404, urging the motor arm 78 rearward (leftward in FIG. 23). The combination of the threaded nut 414, washer 418 and collar portion 420 of bushing 406 act as a stop member against which the motor arm 78 is urged. Specifically the force from spring 410 is transmitted to the nut 414 via a set of mechanical components including the bearing 404, pivot section 400, bearing 402, collar portion 420 of the bushing 406, and washer 418 and detent mechanism described below.

The transverse or Y-direction (left to right in FIG. 23) position of the motor arm 78 is varied by rotation of the nut 414, which occurs by user rotation of the adjustment knob 242 (FIGS. 13, 14) and resultant rotation of the adjustment axle 254 and gears 256, 252 as described above with reference to FIG. 14. As the nut 414 rotates, the screw action causes it to also move transversely in the Y direction along the pivot spindle 240, and due to the pressing force from the spring 410 the motor arm 78 moves transversely along with it. The bushing 406 slides along an outer surface of the pivot spindle 240, and the inner race 412 of bearing 404 is pressed onto bushing 408, which slides along an outer surface of pivot spindle 240. The bushing 408 may alternatively include a flange or collar portion similar to collar portion 420 of the bushing 406.

The nut 414 and washer 418 are co-configured to form a detent mechanism providing several detent locations for a rotation of the nut 414, helping prevent undesired transverse movement of the motor arm 78 after an alignment operation has been performed and a sharpening operation has begun. Specifically, the front face (rightward in FIG. 23) of the nut 414 has a shallow depression in which is disposed a ball, and the washer 418 has an array of corresponding holes or depressions arranged in a circle. As the nut 414 is rotated the ball moves from one hole or depression of the washer 418 to the next, requiring a small force to push the ball sufficiently out of the first hole/depression to enable it to travel to the next. This force is easily generated by the user's rotation of the adjustment knob 242 but not by vibration or other mechanical forces occurring during sharpening operation.

Figure 25:
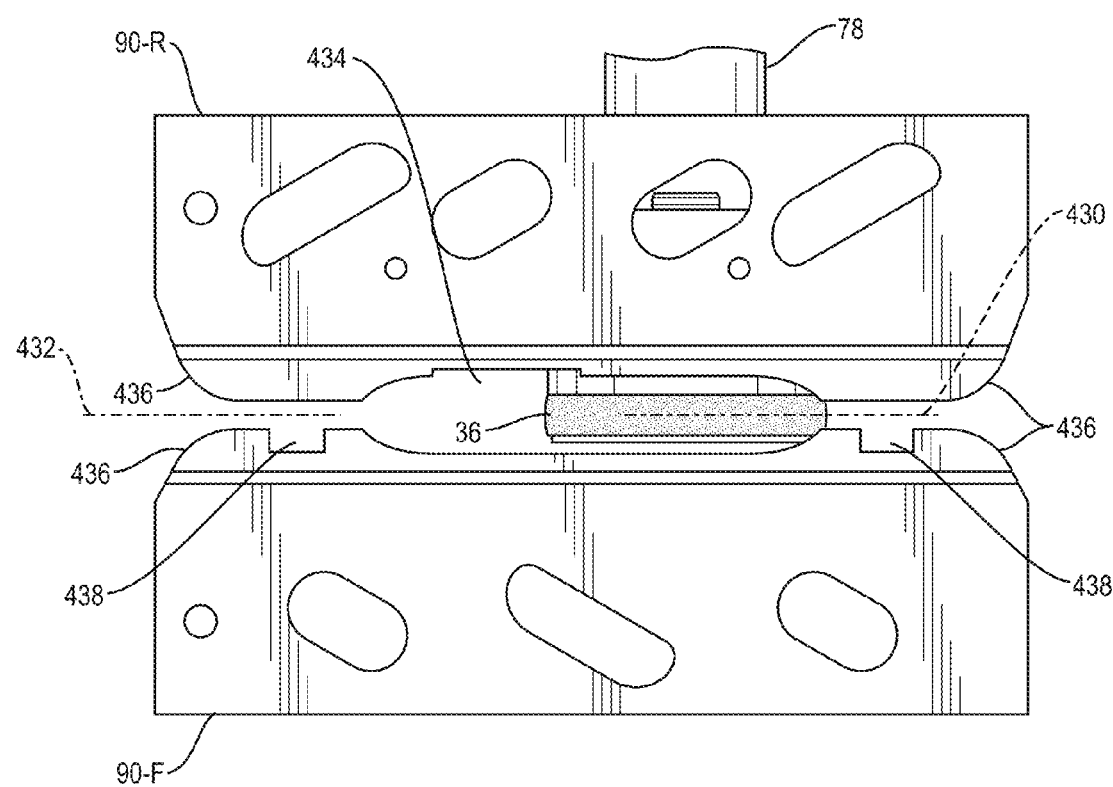
FIG. 25 is a schematic depiction of alignment between clamping jaws and a grinding wheel.

FIG. 25 is a downward view encompassing the jaws 90 and the grinding wheel 36 and motor arm 78 underneath. The jaws 90 are shown in the closed position, slightly spaced apart as they are when retaining a skate blade (not shown). This view is of an aligned position in which a centerline 430 of the grinding wheel 36 is aligned with a centerline 432 of a sharpening position of the skate blade (midway between the clamping surfaces of the jaws 90). It will be appreciated that the grinding wheel 36 can be moved transversely (up and down in the view of FIG. 25) by the above-described Y-adjustment mechanism, changing the position of the grinding wheel centerline 430 with respect to the centerline 432 of the skate blade. In general there is a small range of uncertainty in the position of the grinding wheel 36 relative to the centerline 432 based on mechanical tolerances as well as planned variability, such as varying sizes of grinding wheels 36 that the system supports, etc. The adjustment mechanism enables a user to obtain accurate alignment to achieve as closely as possible the idealized arrangement of FIG. 2, i.e., perfectly symmetrical curvature of the bottom surface 42 of the skate blade 40 about its centerline 432, so that the edges 44 lie in the same plane perpendicular to the X-Z plane of the skate blade 40. In the present context, the required accuracy of alignment is to within approximately +/−0.001". It will be appreciated that this level of accuracy is generally not possible using simple naked-eye observation of the degree of alignment between the grinding wheel 36 and skate blade 40. Thus features that aid alignment to this degree are disclosed.

FIG. 25 also shows certain features of the jaws 90 pertaining to alignment. First is a central open area 434 through which the grinding wheel 36 can be viewed and a separate alignment tool (described below) is received. Thus the jaws 90 are left with endward clamping portions 436. Second are notches 438 formed in the front jaw 90-F which receive corresponding protrusions from the alignment tool so that the alignment tool is properly oriented and located precisely in the left-to-right direction of FIG. 25. This precise locating in turn provides for close spacing of an alignment feature of the alignment tool with a corresponding feature of the grinding wheel 36, as described more below.

Figure 26:
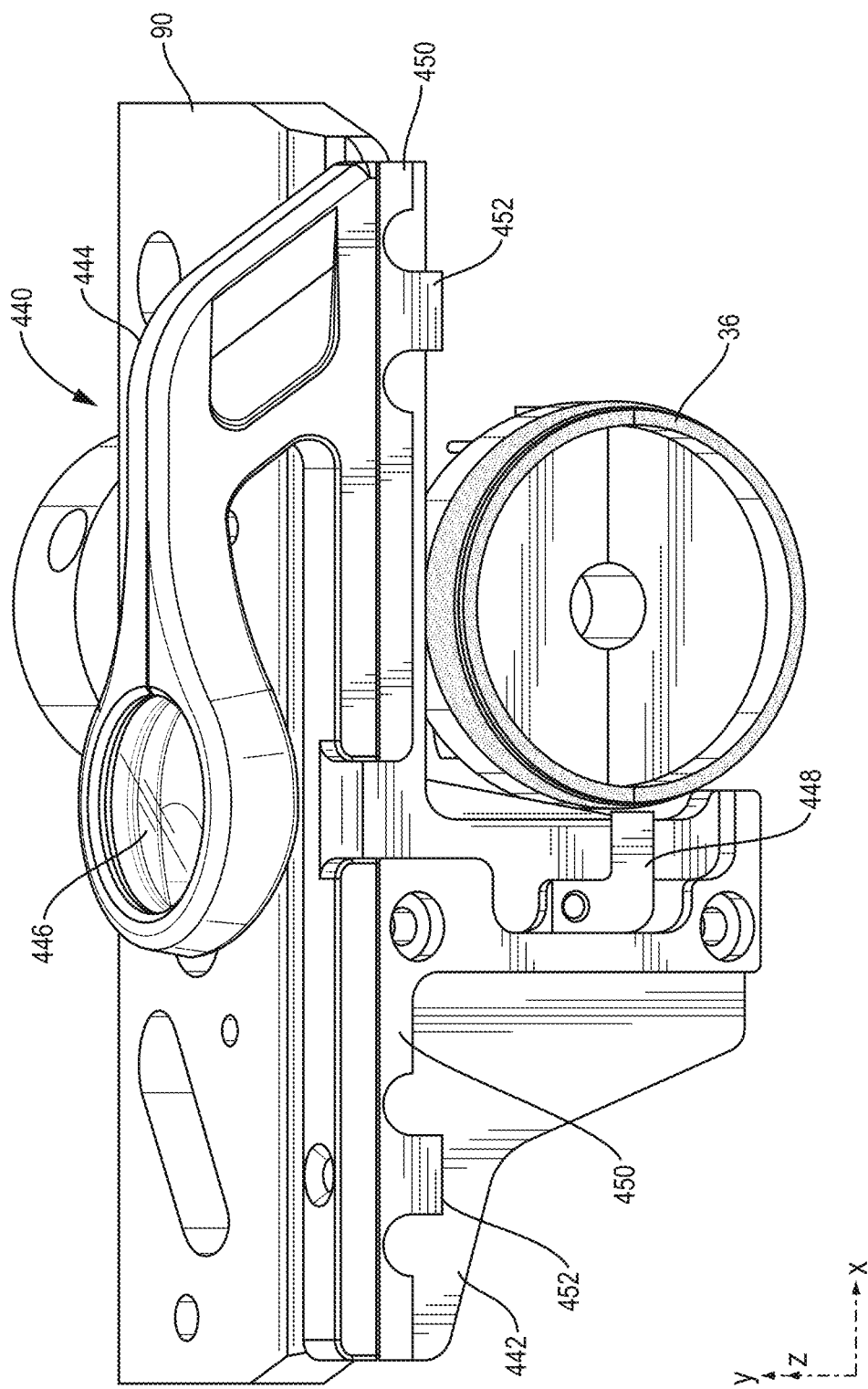
FIG. 26 is a side elevation view of an alignment tool in use.

FIG. 26 illustrates the alignment tool 440 as it is located during use. It has a lower blade-like portion 442 and an upper portion 444 holding a magnifying lens 446. The blade-like portion 442 is clamped between the jaws 90 in the same sharpening position that the skate blade 40 occupies when being sharpened. In this view the front jaw 90-F is omitted for ease of description. The blade-like portion 442 extends downward to support a flag 448 that functions as a first visual reference feature as explained below. In one embodiment the flag 448 is a thin member secured flat against a surface of the lower portion 442. It is thus precisely spaced from the centerline 432 of the jaws 90 (FIG. 25) when the alignment tool 440 is clamped in the illustrated position. In the illustrated embodiment this spacing is on the order of one-half the width of the grinding wheel 36. Also shown in FIG. 26 are machined shoulder portions 450 extending out of the page in this view. Bottom edges of the shoulder portions 450 sit on top of the endward clamping portions 436 of the jaws 90 (FIG. 25), except for the slightly longer protrusions 452 that are received by the notches 438 (FIG. 25). It will be noted that the flag 448 is opposite the grinding wheel 36 along a horizontal diameter. In other embodiments the flag 448 may be formed integrally with the lower portion 442.

In use, a user opens the jaws 90 and inserts the alignment tool 440, locating it so that the shoulder portions 450 sit on top of the endward clamping portions 436 of the jaws 90 and the protrusions 452 are received by the notches 438. The user then closes the jaws 90 so that the alignment tool 440 is retained with the blade-like portion 442 in the same position as a skate blade 40 is retained during sharpening. The carriage 70 is then moved to bring the grinding wheel 36 to the position shown in FIG. 26, i.e., with its outer surface just slightly spaced from the flag 448. This movement may be automatic or manual, and if automatic it may be user-initiated (such as via the user interface 34 of FIG. 1) or in some manner auto-initiated by detection of the presence of the alignment tool 440.

In one embodiment the movement of the grinding wheel 36 into the alignment position of FIG. 26 may employ the same components used for moving the carriage 70 during sharpening, i.e., the carriage motor 260 and rack-and-pinion mechanism. The grinding wheel 36 may be moved until it encounters the alignment tool 440, which can be sensed as an increase in the drive current through the carriage motor 260. Upon sensing this encounter, the controller 32 provides one or more brief pulses of reverse drive current to move the grinding wheel 36 slightly away from the alignment tool 440 to allow for the Y-direction adjustment of the motor arm and grinding wheel 36 as described further below. The movement away from the encounter position could alternatively be guided by use of a position encoder on the motor, for example if greater positional accuracy is needed.

Figure 27:
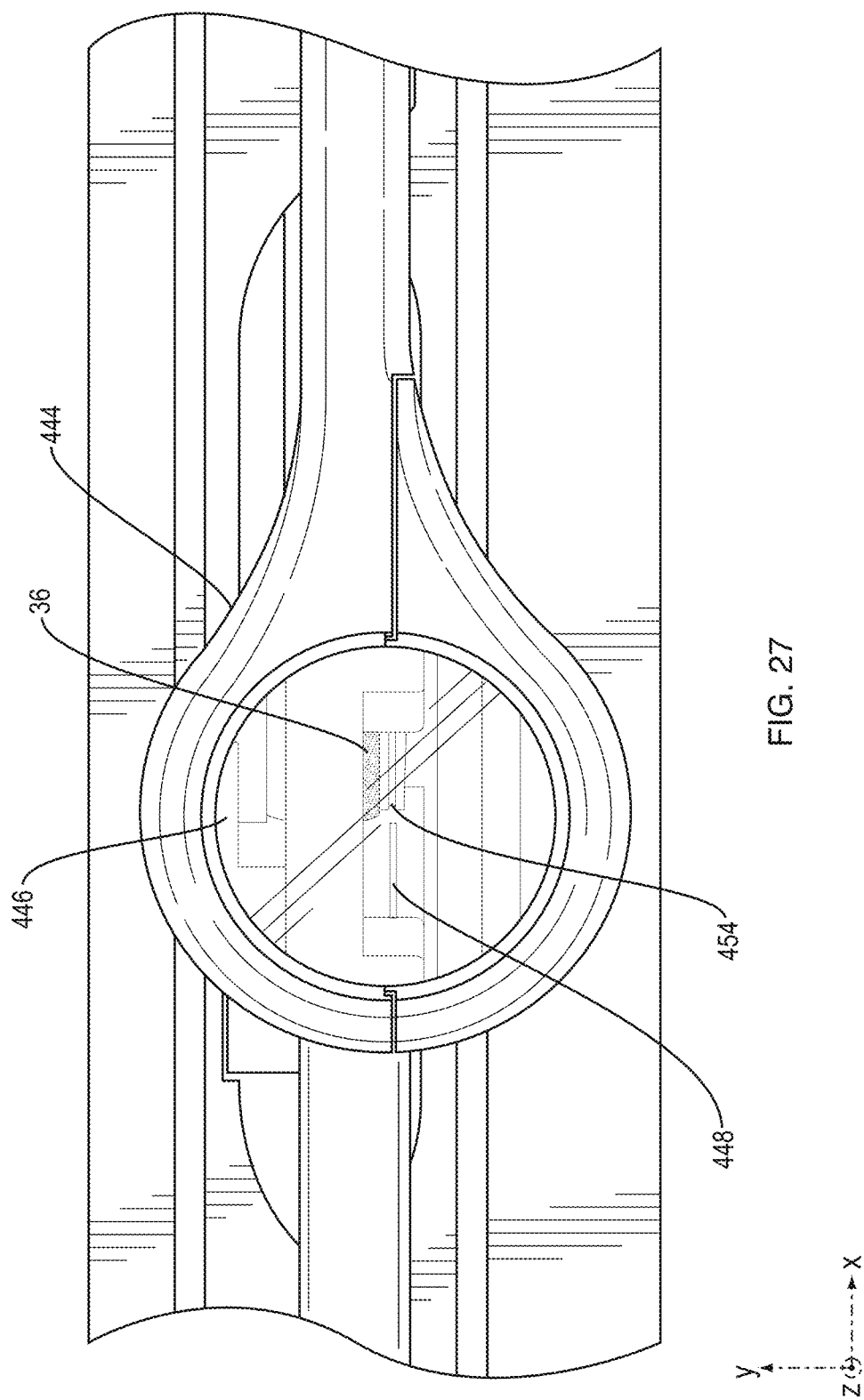
FIG. 27 is a plan view of an alignment tool in use.

FIG. 27 is a view downward through the magnifying lens 446. An area around the flag 448 is visible, with the grinding wheel 36 slightly spaced apart from it. The grinding wheel 36 has an annular notch 454 formed near its front face, which functions as a second visual reference feature as explained below. The notch 454 is precisely spaced from the centerline 430 of the grinding wheel 36 (FIG. 25) by the same amount as the spacing between the flag 448 and the centerline 432 between the jaws 90. Thus, when the flag 448 is aligned with the notch 454, as is shown in FIG. 27, the centerline 430 of the grinding wheel 36 is precisely aligned with the centerline 432 between the jaws 90, and hence with the centerline of the skate blade 40. As indicated, FIG. 27 shows the aligned position. It will be appreciated that when the centerline 430 of the grinding wheel 36 is not aligned with the centerline 432 between the jaws 90, then the notch 454 is correspondingly offset from the flag 448 (in the up and down direction in FIG. 27) as an indication of such misalignment. A user can look through the magnifying lens 446 to view the area of the flag 448 and simultaneously turn the adjustment knob 242 (FIG. 14) to move the motor arm 78 and grinding wheel 36 in the transverse (Y) direction (up and down in FIG. 27) to bring these centerlines into alignment, thereby accurately aligning the grinding wheel 36 with the bottom of the skate blade 40 for a sharpening operation.

Figure 28:
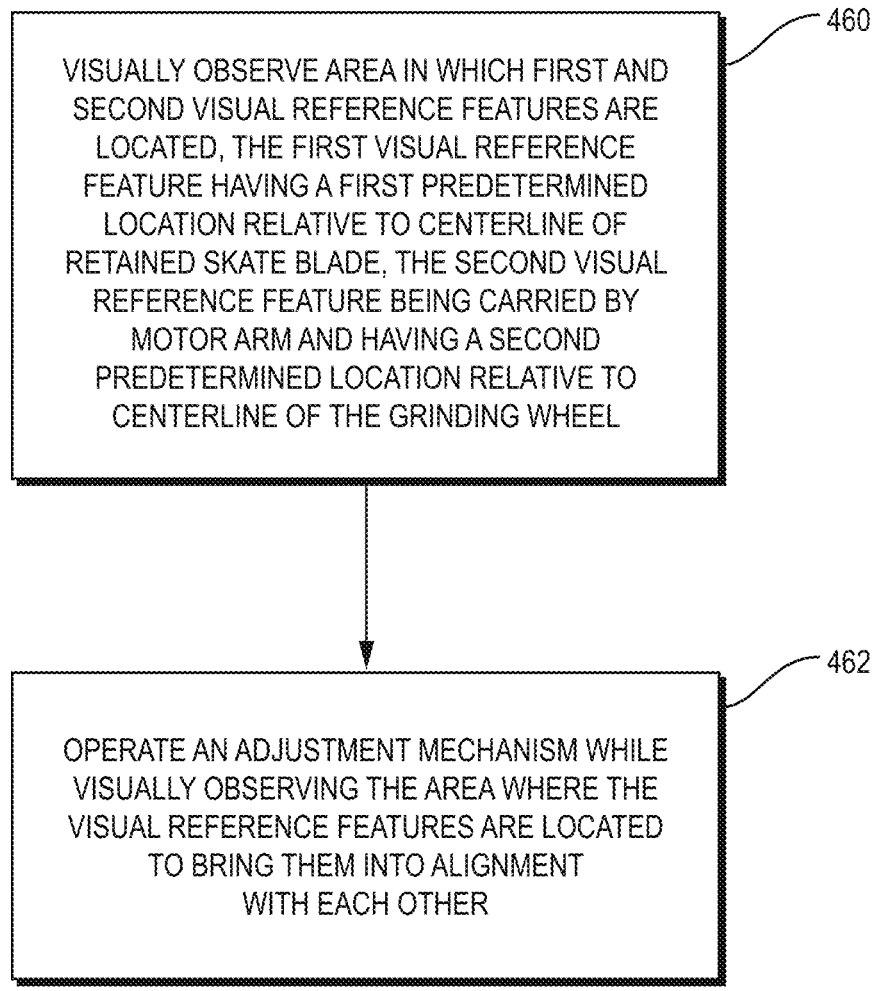
FIG. 28 is a flow diagram of an alignment process.

FIG. 28 is a simplified flow diagram for a process of aligning a grinding wheel to a retained skate blade. The process includes at 460 visually observing an area in which first and second visual reference features of the skate blade sharpening system are located, where the first visual reference feature has a first predetermined location relative to a centerline of the retained skate blade, and the second visual reference feature is carried by a motor arm that also carries the grinding wheel and that has a second predetermined location relative to a centerline of the grinding wheel. In one embodiment the first visual reference feature may be a feature like flag 448 on a separate fixture or tool such as the alignment tool 440 that is clamped in the sharpening position, so that the first visual reference feature is temporarily placed in position for the alignment operation. In alternative embodiments the first visual reference feature may be built in to the sharpening system 10, such as by incorporation into the jaws 90 for example. In one embodiment the second visual reference feature may be a notch or similar feature incorporated on the grinding wheel 36, such as described above.

The process further includes at 462 operating an adjustment mechanism while visually observing the area where the visual reference features are located to bring them into alignment with each other. This brings the grinding wheel and the retained skate blade into an aligned position in which the centerline of the grinding wheel is aligned with the centerline of the retained skate blade. In one embodiment the adjustment mechanism may be configured and used such as described above, but the adjustment mechanism may be realized in different ways in alternative embodiments.

Referring again to FIGS. 26 and 27, the visual reference features in the form of the flag 448 and notch 454 provide for detection of parallax that could affect accuracy of the adjustment. As generally known, parallax is a phenomenon by which two objects that are actually misaligned in a particular direction nonetheless appear aligned when viewed from a different direction. In the present context, parallax could potentially occur if a user is not directly above the flag 448. Because the flag 448 has a height much greater than its thickness, if a user were viewing from a slightly incorrect angle then the flag 448 would appear thicker than when viewed from directly above. A user can adjust his/her viewing angle until the thickness is minimized. Alternatively, if light is striking the sides of the flag 448 then the illuminated sides will be slightly visible when the flag 448 is viewed off-angle. The notch 454 also provides for parallax detection, because it will only be visible as a notch when viewed from directly above. When the area of the notch 454 is viewed off-angle, the notch is visually filled by its own inside surface.

It is noted that the placement of the notch 454 toward an edge of the grinding wheel 36 has significance. Proper grinding occurs at the center of the grinding wheel 36, so if the alignment mark were placed at the center of the grinding wheel 36 then it would be affected by grinding and potentially lose its ability to function as an alignment mark. It might even be erased completely before the end of the usable lifetime of the grinding wheel 36. When formed as a notch or similar feature, it might also compromise the quality of the sharpening. By placing the alignment mark in the form of the notch 454 nearer the edge or face of the grinding wheel 36 it is not affected by the normal wearing of the abrasive over a period of use, and it does not interfere with grinding.

Figure 29:
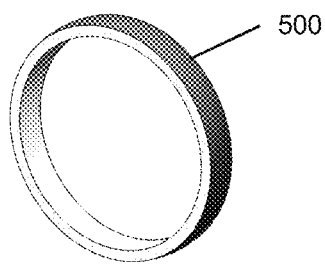
FIG. 29 is a perspective view of an alternative grinding ring.

FIGS. 29-34 illustrate an alternative embodiment employing a slightly different alignment scheme and alignment components. Shown in FIG. 29 is an alternative grinding wheel 500 lacking an alignment feature such as the alignment notch 454 of the grinding wheel 36 as described above. The grinding wheel 500 may in all other respects be similar or identical to the grinding wheel 36. It also may be somewhat simpler and less expensive to manufacture. When manufacturing the grinding wheel 36, certain processing steps are used specifically to form the notch 454. Such steps are not required in manufacturing the grinding wheel 500. As described below, a separate alignment wheel is used for the alignment process.

Figure 30:
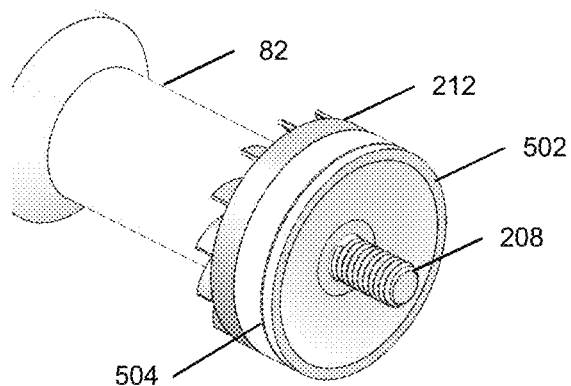
FIG. 30 is a perspective view of an arrangement having an alignment wheel mounted on a spindle.

FIG. 30 shows an alignment wheel 502 in position on the axle 208 of the spindle 82. The alignment wheel 502 has precise similarity to the grinding wheel 500 so that it occupies the same wheel-mounting location against the arbor 212 as occupied by the wheel 36 as described above. As shown, the alignment wheel 502 includes an alignment notch 504 toward its outer face, similar to the notch 454 on grinding wheel 36. The notch 504 serves as a visual reference feature in the same manner as described above for the notch 454. In this embodiment as described more below, an alignment process results in aligning the wheel-mounting location with the skate blade through use of the alignment wheel 502. The alignment wheel 502 is then replaced with the grinding wheel 500 which is then inherently aligned with the skate blade because it occupies the aligned wheel-mounting location. When the alignment wheel 502 has been aligned and then replaced with the grinding wheel 500, the centerline of the grinding wheel 500 is precisely aligned with the centerline 432 of the jaws 90, just as described above with reference to FIGS. 25 and 27.

Figure 31:
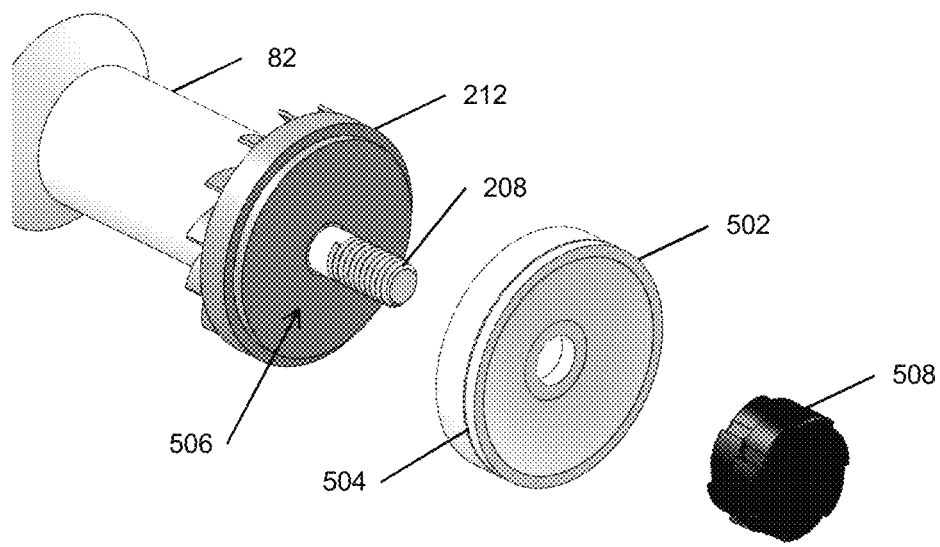
FIG. 31 is a perspective exploded view of arrangement of FIG. 30.

FIG. 31 shows additional details. The alignment wheel 502 is preferably of one-piece construction of a material such as metal or thermoplastic and mechanically preferably mimics the multi-piece grinding wheel assembly 36 (see FIG. 9). As indicated, the alignment wheel 502 is mounted against the arbor 212 at a wheel-mounting location 506 and is retained by a retention nut 508.

Figure 32:
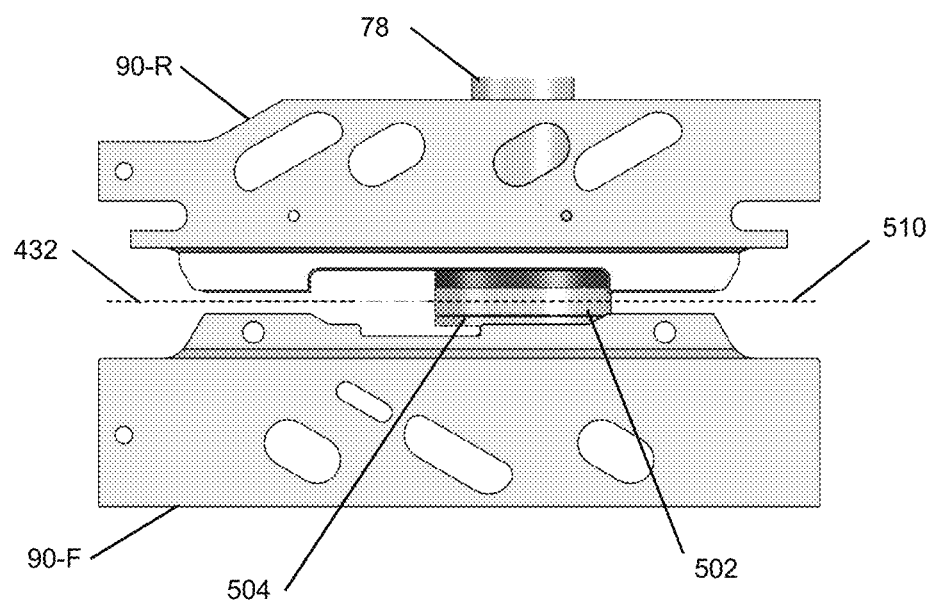
FIG. 32 is a schematic depiction of alignment between clamping jaws and an alignment wheel.

FIG. 32 is a counterpart of FIG. 25 for an embodiment using the alignment wheel 502. This view is of an aligned position in which a centerline 510 of the alignment wheel 502 is aligned with the centerline 432 of the sharpening position of the skate blade (midway between the clamping surfaces of the jaws 90). The alignment wheel 502 can be moved transversely (up and down in the view of FIG. 32) by the above-described Y-adjustment mechanism, changing the position of the alignment wheel centerline 510 with respect to the centerline 432 of the skate blade.

Figure 33:
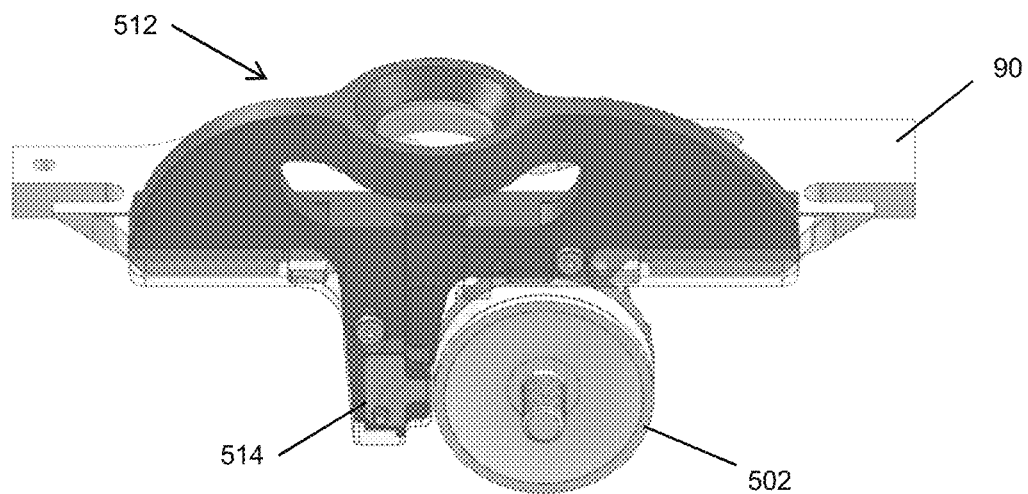
FIG. 33 is a side elevation view of an alignment tool in use with an alignment wheel.

FIG. 33 is a counterpart of FIG. 26 showing use of an alignment tool 512 similar to the alignment tool 440. In particular, the alignment tool 512 includes a flag 514 serving as a visual reference feature in the same manner as the flag 448 of alignment tool 440. The alignment tool 512 differs in appearance from the alignment tool 440, but not in its essential structure and function. The alignment tool 512 could be used in an alignment scheme using a notched grinding wheel 36 such as described above, and the alignment tool 440 could be used in an alignment scheme using a separate alignment wheel 502 as described with reference to FIGS. 29-35.

Figure 34:
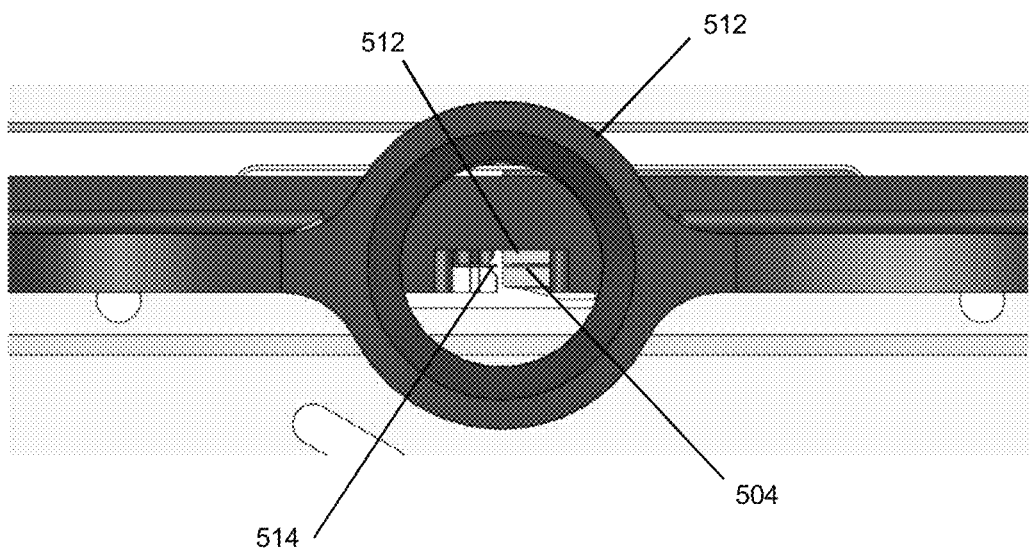
FIG. 34 is a plan view of an alignment tool in use with an alignment wheel.

FIG. 34 is a counterpart of FIG. 27 showing a similar downward view during an alignment process. An aligned position is shown in which the flag 514 is aligned with the notch 504 of the alignment wheel 502.

Figure 35:
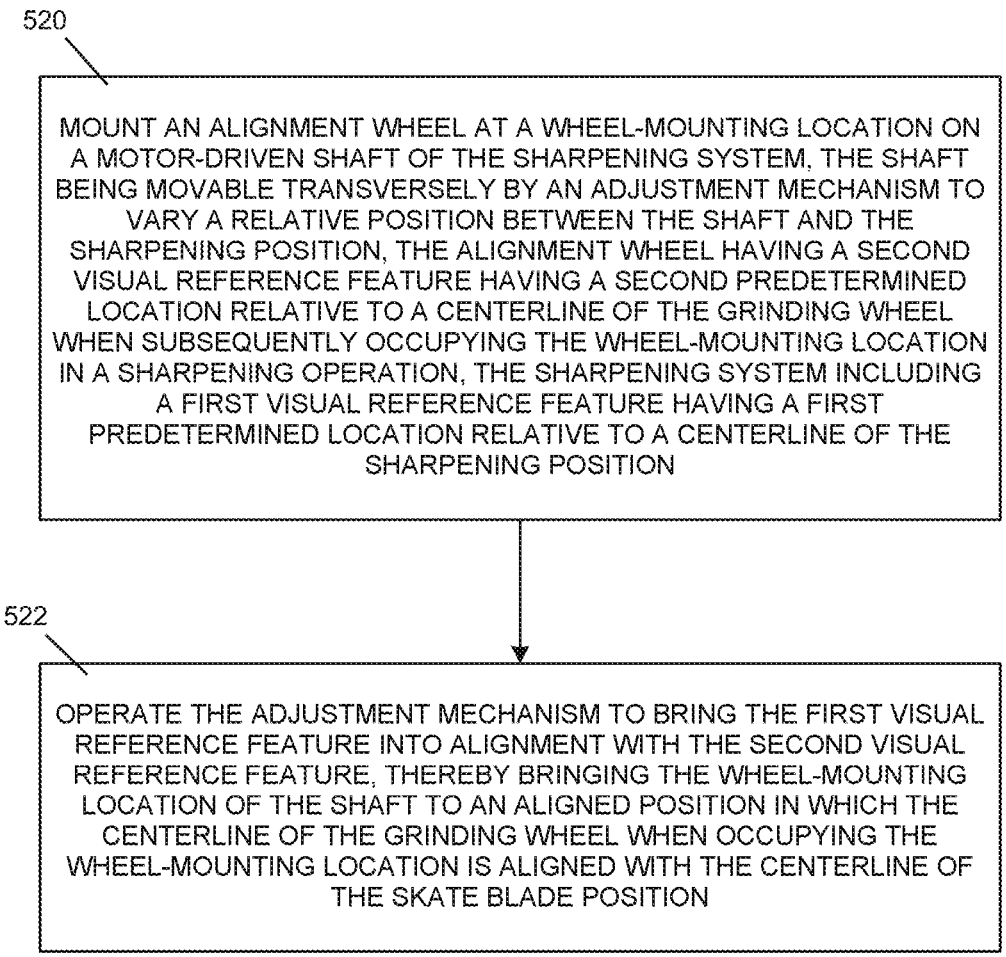
FIG. 35 is a flow diagram of an alignment process using an alignment wheel.

FIG. 35 is a counterpart of FIG. 28, illustrating a process of aligning the grinding wheel 500 to a retained skate blade. The process includes use of a first visual reference feature having a first predetermined location relative to a centerline of the sharpening position. In one embodiment a first visual reference feature can be a flag of an alignment tool (e.g., flag 514 of alignment tool 512).

The process of FIG. 35 includes, at 520, mounting an alignment wheel at a wheel-mounting location (e.g., location 506) on a motor-driven spindle of the sharpening system, the spindle being movable transversely by an adjustment mechanism to vary a relative position between the spindle and the sharpening position. The alignment wheel has a second visual reference feature (e.g., notch 504 of alignment wheel 502) having a second predetermined location relative to a centerline of the grinding wheel when subsequently occupying the wheel-mounting location in a sharpening operation.

The process further includes, at 522, operating the adjustment mechanism to bring the first visual reference feature into alignment with the second visual reference feature, thereby bringing the wheel-mounting location of the spindle to an aligned position in which the centerline of the grinding wheel when occupying the wheel-mounting location is aligned with the centerline of the skate blade position. The alignment may be achieved by visually monitoring relative positions of the visual reference features while operating the adjustment mechanism.

Although the alignment processes and apparatus as described herein contemplate a human user who looks through the magnifying lens 446 and rotates the adjustment knob 242, it will be appreciated that in alternative embodiments a more automated process may be used. For example, some manner of machine vision or other apparatus may be used to monitor relative position between the grinding wheel 36 and alignment tool or between the alignment wheel 502 and the alignment tool, and the adjustment mechanism may be driven by an adjustment motor provided with an electrical adjustment signal. In an embodiment employing automation, a controller can then perform the process of FIG. 28 or FIG. 35 based on position information from the position-monitoring apparatus and by generating the electrical adjustment signal to change the relative positions of the respective components accordingly until an aligned position is detected. Alternatively, in a less automated system, the offset may be displayed in numbers or graphics to a human user who controls the adjustment.

While various embodiments of the invention have been particularly shown and described, it will be understood by those skilled in the art that various changes in form and details may be made therein without departing from the spirit and scope of the invention as defined by the appended claims.

What is claimed is:

1. A skate blade sharpening system, comprising:
   a clamp configured to retain a skate blade in a sharpening position, a centerline of the sharpening position having a first predetermined location relative to a first visual reference feature of the skate sharpening system;
   a motor-driven rotating shaft, the shaft having a wheel-mounting location at which a grinding wheel is mounted to rotate with the shaft and contact the skate blade in the sharpening position during a sharpening operation, the shaft also accepting an alignment wheel mounted at the wheel-mounting location during an alignment operation, the alignment wheel having a second visual reference feature that, when the alignment wheel occupies the wheel-mounting location, has a second predetermined location relative to a centerline of the grinding wheel when occupying the wheel-mounting location; and
   an adjustment mechanism for moving the shaft transversely during the alignment operation to vary a relative position between the wheel-mounting location and the sharpening position across a range, the range including an aligned position of the wheel-mounting location in which the centerline of the grinding wheel when occupying the wheel-mounting location is aligned with the centerline of the sharpening position, the aligned position being indicated by alignment of the first visual reference feature with the second visual reference feature during the alignment operation.

2. A skate blade sharpening system according to claim 1, wherein the second visual reference feature includes an alignment notch or protrusion on the alignment wheel, and wherein the first visual reference feature includes an indicator feature placed along a path of the alignment wheel for the alignment operation.

3. A skate blade sharpening system according to claim 2, wherein the indicator feature is part of an alignment tool used for the alignment operation, the alignment tool including a blade-like portion having a centerline at the first predetermined location relative to the indicator feature, and wherein the clamp is configured to retain the blade-like portion of the alignment tool in the sharpening position during the alignment operation.

4. A skate blade sharpening system according to claim 3, wherein the indicator feature is a flag secured at one surface of the blade-like component, the flag presenting an edge in a direction of viewing the indicator feature in the alignment operation.

5. A skate blade sharpening system according to claim 3, wherein the alignment tool includes a magnifying lens disposed along a line of sight to an area of the first visual reference feature, the magnifying lens presenting an enlarged image of the area to a user during the alignment operation, and wherein the clamp is configured to leave the line of sight unobstructed when the alignment tool is in the sharpening position to permit viewing of the area during the alignment operation.

6. A skate blade sharpening system according to claim 5, wherein the clamp includes a pair of opposed jaws having endward clamping portions and a central open area through which the line of sight extends.

7. A skate blade sharpening system according to claim 3, wherein the clamp is co-configured with the alignment tool with respective keying features by which the blade-like portion of the alignment tool is retained in a precise position to place the indicator feature immediately adjacent to a surface of the alignment wheel during the alignment operation.

8. A skate blade sharpening system according to claim 7, wherein the clamp includes a pair of opposed jaws, and wherein the keying features include a protrusion from a face of the blade-like portion of the alignment tool and a corresponding notch in one of the jaws, the notch receiving the protrusion when the blade-like portion of the alignment tool is retained in the precise position.

9. A skate blade sharpening system according to claim 7, wherein the alignment tool has a housing including first keying features and/or visual alignment features, and further including a platform supporting the clamp and having second keying and/or visual alignment features corresponding to the first keying features.

10. A skate blade sharpening system according to claim 9, wherein the second keying and/or visual alignment features include a recess in the platform into which the alignment tool fits only one way.

11. A skate blade sharpening system according to claim 1, wherein the first and second visual reference features have different appearances along a correct line of sight than off the correct line of sight to enable detection of parallax.

12. A skate blade sharpening system according to claim 1, further including (i) a carriage on which a motor arm is mounted, the carriage being movable in the direction of the centerline of the skate blade during the sharpening operation, and (ii) a controller operative to (a) move the carriage to move the grinding wheel along a length of the skate blade during sharpening, and (b) during the alignment operation, move the carriage to bring the second visual reference feature adjacent to the first visual reference feature for viewing their relative positions.

13. A skate blade sharpening system according to claim 1, further including:
machine vision apparatus operative to perceive relative alignment between the first and second visual reference features and to generate a corresponding alignment signal indicating alignment status, the alignment status and the adjustment mechanism being used by a separate actor to align the first visual reference feature with the second visual reference feature.

14. A skate blade sharpening system according to claim 13, wherein the adjustment mechanism is operative in response to an electrical adjustment signal, and wherein the separate actor includes a controller operative in response to the alignment signal to generate the electrical adjustment signal to align the first visual reference feature with the second visual reference feature.

15. A skate blade sharpening system according to claim 1, wherein the adjustment mechanism includes:
a pivot spindle having a long axis transverse to the centerline of the grinding wheel;
a bearing on which a motor arm is mounted for pivoting about the pivot spindle to enable the grinding wheel to follow a profile of the skate blade during sharpening;
a bushing disposed between the pivot spindle and an inner race of the bearing, the bushing providing for transverse movement of the motor arm by permitting movement of the bearing along the long axis of the pivot spindle.

16. A skate blade sharpening system according to claim 15, further including (i) a spring generating a bias force urging against a side face of the inner race of the bearing, and (ii) an adjustable stop member on the pivot spindle against which the motor arm is urged by the bias force, the stop member being moved under user control to move the motor arm transversely.

17. A skate blade sharpening system according to claim 16, wherein the pivot spindle has screw threading and the stop member includes a threaded nut engaging the screw threading of the pivot spindle, the threaded nut being rotated under the user control.

18. A skate blade sharpening system according to claim 17, wherein the threaded nut includes a driven gear, and wherein the adjustment mechanism further includes:
an adjustment spindle mounted adjacent to and extending in the same direction as the pivot spindle;
a user-rotatable adjustment knob mounted at one end of the spindle to enable a user to rotate the adjustment spindle; and
a driving gear mounted at the other end of the adjustment spindle and engaging the driven gear of the threaded nut to cause the threaded nut to rotate as the user rotates the adjustment knob.

19. A skate blade sharpening system according to claim 18, wherein the adjustment spindle is below a bottom edge of the skate blade.

20. A skate blade sharpening system according to claim 17, wherein the stop member further includes a detent mechanism providing a plurality of detent positions to prevent the threaded nut from rotating during the sharpening operation.

21. A method of aligning a grinding wheel to a sharpening position in a skate blade sharpening system, the sharpening position being occupied by a skate blade during sharpening, the sharpening system including a first visual reference feature having a first predetermined location relative to a centerline of the sharpening position, the method comprising:
mounting an alignment wheel at a wheel-mounting location on a motor-driven shaft of the sharpening system, the shaft being movable transversely by an adjustment mechanism to vary a relative position between the shaft and the sharpening position, the alignment wheel having a second visual reference feature having a second predetermined location relative to a centerline of the grinding wheel when subsequently occupying the wheel-mounting location in a sharpening operation; and operating the adjustment mechanism to bring the second visual reference feature into alignment with the first visual reference feature, thereby bringing the wheel-mounting location of the shaft to an aligned position in which the centerline of the grinding wheel when occupying the wheel-mounting location is aligned with the centerline of the sharpening position.

22. A method according to claim 21, further including:

placing an alignment tool in the skate sharpening system and using the alignment tool in the visually observing and adjustment-mechanism operating, the alignment tool carrying the first visual reference feature and including a blade-like portion placed in the sharpening position, the first visual reference feature being located at the first predetermined location relative to a centerline of the blade-like portion.

23. A method according to claim 21, wherein the second visual reference feature includes an alignment notch or protrusion on the alignment wheel, and wherein the first visual reference feature includes an indicator feature placed along a path of the alignment wheel for an alignment operation.

* * * * *